(12) United States Patent
Moro

(10) Patent No.: US 12,307,159 B2
(45) Date of Patent: May 20, 2025

(54) PREDICTIVE MEDIA CACHING

(71) Applicant: Block, Inc., Oakland, CA (US)

(72) Inventor: Stefan Moro, Trautskirchen (DE)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 18/228,403

(22) Filed: Jul. 31, 2023

(65) Prior Publication Data

US 2024/0053951 A1 Feb. 15, 2024

Related U.S. Application Data

(60) Provisional application No. 63/397,156, filed on Aug. 11, 2022.

(51) Int. Cl.
| | |
|---|---|
| *G06F 3/0482* | (2013.01) |
| *G06F 3/16* | (2006.01) |
| *G06N 20/00* | (2019.01) |

(52) U.S. Cl.
CPC ............ *G06F 3/165* (2013.01); *G06F 3/0482* (2013.01); *G06N 20/00* (2019.01)

(58) Field of Classification Search
CPC ... G06F 3/06; G06F 15/16; G06F 9/00; G06F 9/4401; G06F 12/0875; G06F 3/0482; G06F 3/0484; G06F 3/16; G06N 20/00
See application file for complete search history.

(56) References Cited

U.S. PATENT DOCUMENTS

| | | | | |
|---|---|---|---|---|
| 11,227,127 B2* | 1/2022 | Kumar | .................... | G06F 40/30 |
| 2012/0151539 A1 | 6/2012 | Funge et al. | | |
| 2015/0334204 A1* | 11/2015 | Bilinski | .............. | H04L 67/5683 |
| | | | | 715/748 |
| 2018/0189021 A1* | 7/2018 | Oskarsson | .............. | G06F 3/165 |
| 2018/0189226 A1* | 7/2018 | Hofverberg | ......... | G06F 12/1408 |
| 2022/0012281 A1* | 1/2022 | Katz | .................... | H04N 21/251 |

OTHER PUBLICATIONS

Deldjoo et al., "Content-based Music Reconunendation: Evolution, State of the Art, and Challenges", Arxiv.org, Cornell University Library, Submitted on Jul. 25, 2021 (v1), last revised Jan. 2, 2023 (v2), 29 pages.

Koch et al., "MIRA: Proactive Music Video Caching Using ConvNet-Based Classification and Multivariate Popularity Prediction", IEEE 26th International Symposium on Modeling, Analysis, and Simulation of Computer and Telecommunication Systems (MASCOTS), IEEE, Sep. 25, 2018, 7 pages.

* cited by examiner

*Primary Examiner* — Rayeez R Chowdhury
(74) *Attorney, Agent, or Firm* — Lee & Hayes, P.C.

(57) ABSTRACT

Methods and systems for predicting media caching include determining likelihoods that given media content items currently displayed on a user interface will be selected by a user for output of the media content items by a client device. The likelihoods are compared and for the media content item or group of media content items with the greatest likelihood of being selected, at least a portion of the media content item or group of media content items are cached in memory of the client device such that, when the media content item or group of items is selected, the portion of the media content item or group of items is output from the cache and a remainder of the item or group of items is streamed from a media content platform.

20 Claims, 15 Drawing Sheets

PREDICTIVE MEDIA CACHING

PRIORITY

This patent application claims priority to U.S. Provisional Patent Application No. 63/397,156, filed on Aug. 11, 2022, and entitled "PREDICTIVE MEDIA CACHING," which is fully incorporated by reference herein in its entirety.

TECHNICAL FIELD

Content such as music is now available online. Such content is searchable, selectable, and downloadable for users across the globe. However, challenges for content delivery still exist.

BRIEF DESCRIPTION OF THE DRAWINGS

Features of the present disclosure, its nature and various advantages, will be more apparent upon consideration of the following detailed description, taken in conjunction with the accompanying drawings. In the figures, the leftmost digit(s) of a reference number identifies the figure in which the reference number first appears. The use of the same reference numbers in different figures indicates similar or identical items or features. The drawings are not to scale.

DETAILED DESCRIPTION

Figure 1:
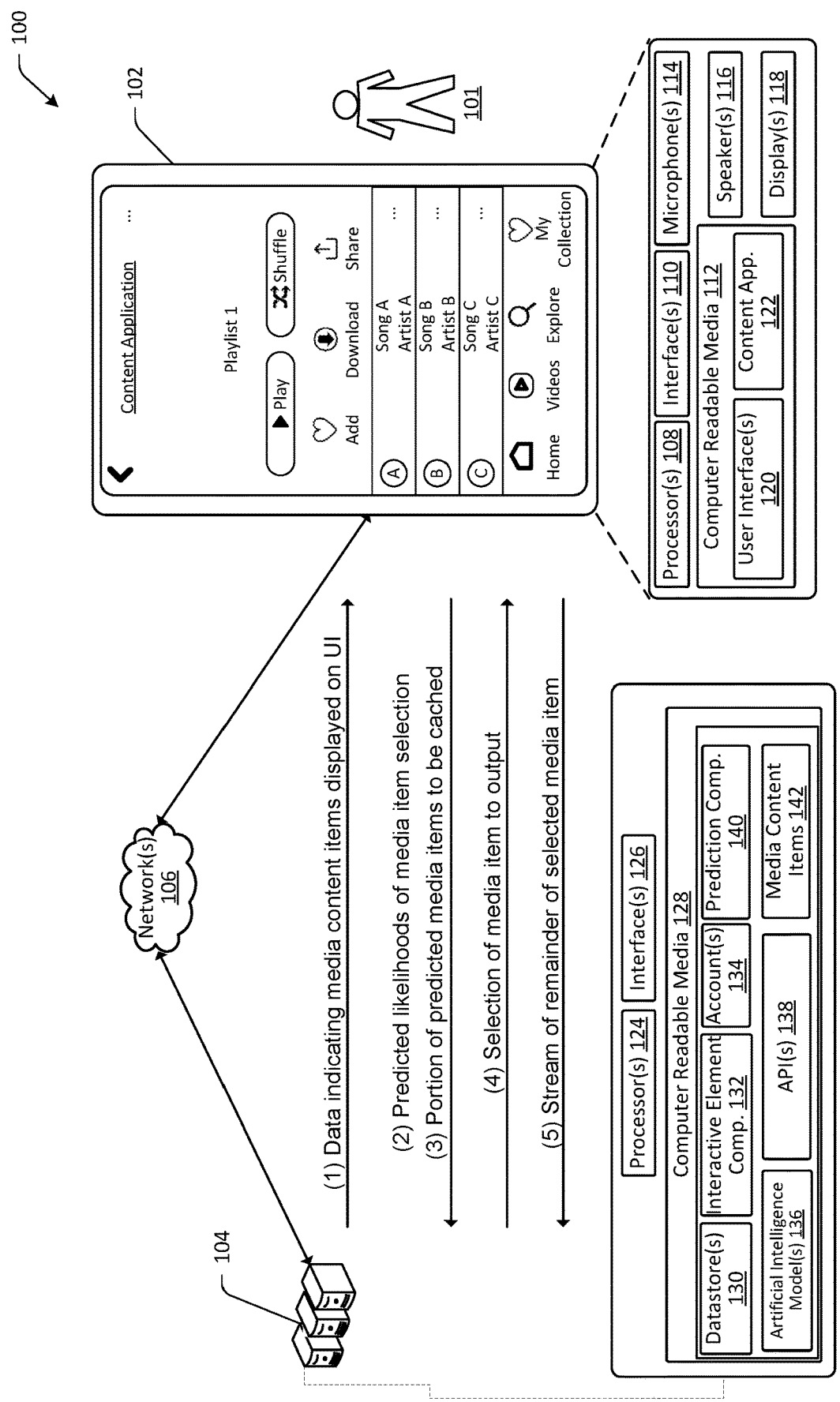
FIG. 1 is a schematic diagram of an example environment for predictive media caching, according to an embodiment described herein.

Caching the beginning of a song (e.g., 10-30 seconds) locally at a client device, rather than streaming from a server, can reduce the amount of time it takes for the song to begin playing. However, client devices have limited memory and it may be unrealistic to have hundreds or thousands of songs cached in case they are selected to be played because this may greatly increase computational demand and need for storage. The described techniques determine which media (also described herein as media content items), e.g., song, or a subset of songs, a user is likely to access, e.g, play or stream, from multiple songs currently displayed in a graphical user interface (GUI), and caches a portion, e.g., the beginning, of that song or songs to reduce initial playback time. It should be understood that while songs are utilized as an example throughout this disclosure, any media content item, including images, videos, documents, web pages, user interfaces, and/or other content may be predictively cached as described herein.

To do so, a client device may be caused to display a user interface provided by a media content platform. The user interface may include various representations of various media content items. Just by way of example, the media content items may correspond to songs that the media content platform may provide to users that subscribe to or are otherwise associated with the media content platform. The user interface may display selectable elements (also described herein as representations) that each correspond to the media content items. For example, a user may search for songs by a certain artist, and the results of that search may be displayed on the user interface. The results may include the songs determined to be associated with the artist, and a selectable element may be displayed in association with each song from the search results.

At this point, a user may select one or more of the selectable elements to cause the client device to output or otherwise surface the media content item(s) that were selected. Generally, when user input data is received indicating a selection of a media content item, a request for data representing the media content item is sent to the media content platform, which identifies the data and sends an instance of the data representing the selected media content item to the client device that requested such data. While in some instances this process may be relatively quick, in other instances the operations associated with sending the request, generating a response at the media content platform, searching for and finding the media content item, sending the response to the client device, and then the client device interpreting and utilizing that response may be both time-intensive and computationally-intensive for both the client device and the media content platform.

To reduce use of computational resources as well as to promote savings in memory storage associated with the client device, among other benefits, the present disclosure describes the ability to predictively cache portions of media content items on the client device such that when the selectable elements for those media content items are selected, the portion of the media content item cached in memory of the client device is utilized to initiate output of the media content item on the client device, for example without unintentional delay that may occur when accessing the media content item from a remote server. The remainder of the media content item can be streamed from the media content platform, where initiation of the streaming process can be performed in parallel with output of the cached portion of the media content item.

To predict which media content items may be selected, a determination may first be made as to which selectable elements representing media content items are currently displayed on a user interface or that were searched for by the user in question. This initial process may parse the potentially millions of media content items to several hundred or perhaps even just a few dozen or fewer options. Then, a likelihood of some or each of the media content items being selected to be output by the client device may be determined. In examples, the likelihood may be based at least in part on at least one of popularity of a given media content item relative to other media content items on the media content platform, a recency that the media content item was played by the client device, a time at which the media content item was released by the media content platform, portion of the media that was accessed on another platform, e.g., a streaming platform, a social network platform, and the like, or an association of the media content item with a further media content item that was previously played or is currently being played by the client device. Additional data that may be utilized to determine likelihoods that media content items will be selected is described in more detail below.

Other input types may include, for example, indicators of activities that a user is involved in when the request for the media content item is provided. For example, scheduling data and/or user input indicating user activities may be utilized to determine what activity the user is involved in or is likely to be involved in when the request for media content items is received or when the user interface is displayed on the client device. By way of example, a user may be engaged in the activity of exercising, and this activity may be more associated with given playlists, music genres, etc. In another example, the user may be engaged in a work-related activity, and this activity may be more associated with other playlists, music genres, etc.

Likewise, the device type of the client device may evidence which media content items are more likely to be selected over other media content items. For example, if the client device is a desktop computer or laptop computer issued in relation to a work profile, such a device type may evidence that the device is utilized for work more frequently than for other purposes, and such use may be more associated with given playlists, music genres, etc. In other examples, the client device may be a mobile device, a wearable device, or a device associated with a given purpose such as tracking health statistics, workout routines, etc. In this example, such a device type may be associated with other media content items. In some examples, the device types may be mapped to historical media content item usage to determine, for a given user or group of users, what media content items or categories of media content items have a higher likelihood to be utilized by a client device of a given device type.

In still other examples, other applications being utilized by the client device when the user interface is enabled or when a content application associated with the media content platform is enabled may inform the likelihood of given media content items being selected. For example, applications associated with work functions, Internet browsing, social media, etc. may be associated with historical selection of given media content items or categories of media content items. As such, when certain applications are enabled on the client device, those applications may impact the likelihood that a given media content item will be selected.

In examples, an artificial intelligence model may be generated and configured to determine the likelihoods of media content item selection. Additionally, one or more training datasets may be generated to train the artificial intelligence model to predict selection of media content items. The training datasets may include any or all of the data described herein, including feedback data indicating whether previously-predicted media content items were in fact selected by a user of the client device or other users of other client devices. Thereafter, a trained artificial intelligence model may be generated utilizing the training dataset and the trained artificial intelligence model may be used to predict whether given media content items will be selected. By so doing, the computer-centric problem of training artificial intelligence models to perform operations that were not available prior to training and that provide a superior result to what a human could hope to achieve is solved by the computer-centric solutions described herein.

When the likelihoods of media content item selection have been determined, the media content items may be ranked based at least in part on the likelihoods, with the higher-likelihood media content items being ranked more favorably than other media content items with lower likelihoods of selection. Thereafter, a given number of media content items may be selected for caching utilizing the ranking. In some examples, the higher-likelihood media content item may be cached. In other examples, a given number of the highest ranked media content items may be cached. The artificial intelligence models described herein may be utilized to determine, for a given client device, how many media content items are to be selected for caching as described herein. In still other examples, the systems described herein may determine that there is a difference between a likelihood that a given media content item will be selected and an additional likelihood that another media content item will be selected. Based at least in part on this difference, one of the two media content items may be precached as described herein.

Thereafter, the client device may cache, such as based on a command from the media content platform, a portion of the media content item(s) that were predicted to be selected in memory of the client device without caching the media content item(s) that were predicted to be less likely to be selected. This process may include querying the media content platform for the portion of the media content item(s), receiving data representing the portion of the media content item(s), and caching the portions of the media content item(s) in memory of the client device.

During these caching operations, the user interface displaying the selectable elements corresponding to the media content items may still be displayed to the user and the user may determine which media content item to select. The client device may receive user input indicating a selection of the representation of the media content item in the user interface and may generate corresponding user input data indicating the selection. Based at least in part on receiving the selection of a representation of a media content item, the client device may surface the portion of the media content item cached in the memory of the client device instead of media content items that were not selected without additional user intervention. The media content item that was selected may start being output by the client device, and while the media content item is being output, the client device may send a request to the media content platform to stream a remaining portion of the media content item.

In this example, feedback data may be generated based at least in part on the media content item that was selected by the user. In the example above, the user selected a media content item that was predicted to be selected and that was cached in memory of the client device. This positive feedback data may be utilized to determine that the trained artificial intelligence model properly predicted that the media content item would be selected. In other examples, the feedback data may indicate that the selected media content item was not an item that was partially cached because the item was predicted to be less likely to be selected than other media content items. In this example, the feedback data may be utilized as a negative dataset to train the artificial intelligence model. This may result in utilizing different data or factors to determine subsequent likelihoods, utilizing different weightings for such factors, or to alter the number of media content items to partially cache such as in situations where the selected item was ranked near a determined cutoff of items that were cached.

In some examples, a given number, say for example 5, of the higher-likelihood selected media content items may be partially cached in memory of the client device. Over time, the user may select media content items, which may be items from the 5 higher-likelihood items or other items. If the user selections are typically the top 1, 2, or 3 higher-likelihood items, for example, the artificial intelligence model may determine that 3 or perhaps 4 of the higher-likelihood media content items should be cached in the client device memory. Thereafter, the threshold number of media content items may be reduced to 3 or 4 such that memory is saved on the client device in question but the benefits of predictive content caching are maintained. Additionally, instead of saving on memory storage by reducing the number of cached partial media content items, the portion of each stored media content item may be increased. For example, if 10 seconds of the top 6 higher-likelihood media content items were previously stored (a total of 60 seconds of content), and the feedback data indicates the top 3 items are frequently selected, the number of media content items to be partially stored may be reduced to 3 items but 20 seconds of each item may be stored instead of 10 seconds of each item. In this way, memory of the client device allocated for caching is utilized more efficiently than traditional caching techniques, as well as overall reduction of memory used for caching.

Further, the number of items to be cached, and/or the duration of the cached portion, may change based on a particular user interface being displayed. For example, a user may frequently play a first playlist that includes songs from animated movies when in the car with children of the user. The user in this example may alternate between starting the playlist from the beginning and starting the playlist from one of the children's favorite songs in the middle of the playlist. Accordingly, the artificial intelligence model may determine that the first song and the song in the middle of the playlist have a higher likelihood to be played from the first playlist, and cache the initial portions of these two songs when the user interface corresponding to the first playlist is being displayed. The user may have another playlist that is played while working out which the user likes to start from various different songs. When the user interface associated with the second playlist is displayed, the artificial intelligence model may determine that more than the beginnings of two songs should be cached, such as the beginnings of 5 songs that have been the least recently played. In another example, the portion selected or recommended may be based on user interaction with the song, or similar songs, on another platform, e.g., on a social networking platform or a streaming platform where the user may have used the song as a background score for a video. In some cases, a first portion is approximately the first ten seconds of the song because ten seconds of pre-buffering aligns with royalty requirements such that if the user skips before the ten seconds pre-buffered portion is played, a royalty is not accessed for listening to the song. In addition, avoiding of downloading the entire next song conserves bandwidth and memory.

Additionally, when a user interacts with the user interface as described herein, the media content platform may receive a request for media content at the client device. In response, the media content platform may provide the user interface for display by the client device and playback information for the media content item that was requested. In these examples, both the request and the playback information may be cached at the client device. Thereafter, a similar request may be received at the media content platform and from the client device, and the playback information included in the prior response may be utilized when the request is received subsequent times without sending another request to the media content platform.

FIG. 1 is an example environment 100 for predictive media caching, according to an embodiment described herein. The environment 100 of FIG. 1 may include a user 101 associated with a client device 102 and a media content platform 104, which can communicate via network(s) 106. The user 101 can be any user that initiates use of a content application 122 associated with the media content platform 104. Each of the devices depicted in FIG. 1 can comprise one or more computing devices. Additional details associated with the client device 102, the media content platform 104, and the network(s) 106 are described below with reference to FIGS. 10-14.

The client device 102 may include one or more components such as one or more processors 108, one or more network interfaces 110, computer-readable media (CRM) 112, one or more microphones 114, one or more speakers 116, and one or more displays 118. The microphones 114 may be configured to receive audio input from the environment 100 and to generate corresponding audio data, which may be utilized as discussed herein. The speakers 116 may be configured to output audio, such as audio associated with a given media content item and/or with the content application 122. The displays 118 may be configured to present graphical user interfaces. In some examples, the displays 118 can output images, videos, or the like via such graphical user interfaces.

The CRM 112 may include one or more applications or other components. For example, the one or more applications or other components can include one or more user interface(s) 120 and a content application 122. A user interface 120 can be included in the content application 122 as an interstitial, widget, or pop-up display. The CRM 112 can include additional or alternative applications such as a music streaming application, a messaging application, an email application, a forum application, a photo application, or the like. In some examples, the applications can be provided by a same service provider (e.g., the media content platform 104) or different service providers.

The applications or other components may be configured to execute in the foreground and background of the device 102. For example, the content application 122 may be configured to execute in the foreground when a user is actively engaged in one or more of the functionalities of the content application 122. In other examples, the content application 122 may be configured to execute in the background when a user is not actively engaged in one or more of the functionalities, but the content application 122 is still "open" and is capable of communicating with other applications on the device 102 and/or with media content platform 104 associated with the content application 122. For example, a web browser application may be executing in the foreground and an interaction with an interactive element as described in more detail herein may occur. The content application 122, running in the background, may be caused to be displayed in the foreground in response to certain user input provided to the client device 102. In some such examples, the content application 122 can transition to the foreground to perform operations associated with media content items. In other examples, the content application 122 itself may be utilized to display interactive elements associated with media content items. It should be understood that the user interfaces 120 described herein may include the content application 122 and may include one or more other user interfaces as described herein. It should also be understood that the content application 122 or the functionality associated therewith can be integrated with other applications, such as third-party applications.

The media content platform 104, which can be associated with one or more computing devices, such as server computing devices, may include components such as one or more processors 124, one or more network interfaces 126, and/or CRM 128. The CRM 128 may include one or more components such as, for example, datastore(s) 130, an interactive element component 132, one or more accounts 134, one or more artificial intelligence models 136, one or more application programming interfaces (APIs) 138, a prediction component 140, and media content items 142. These components will be described below by way of example.

In at least one example, the media content platform 104 can expose functionality and/or services via the one or more APIs 138, thereby enabling functionality and/or services described herein to be integrated into various functional components of the environment 100. The API(s) 138, which can be associated with the media content platform 104, can expose functionality described herein and/or avail services to various functional components associated with the environment 100. At least one of the API(s) 138 can be a private API, thereby availing services and/or functionalities to functional components (e.g., applications, etc.) that are developed internally (e.g., by developers associated with the media content platform). At least one of the API(s) 138 can be an open or public API, which is a publicly available API that provides third-party developers (e.g., work-related platforms described herein) with programmatic access to a proprietary software application or web service of the media content platform. That is, the open or public API(s) can enable functionality and/or services of the media content platform to be integrated into one or more applications. The API(s) 138 can include sets of requirements that govern how applications, or other functional components, can interact with one another.

In some examples, the media content platform 104 can provide third-party entities with a software developer kit ("SDK") that may utilize functionality exposed by the API(s) 138. The SDK can include software development tools that allow a third-party developer (i.e., a developer that is separate from the media content platform) to include functionality and/or avail services as described herein. The SDK and/or the API(s) 138 may include one or more libraries, programming code, executables, other utilities, and documentation that allows a developer to directly include functionality and/or avail services described herein within an application.

The datastore(s) 130 can store, among other types of data, user profiles. For instance, a user profile of the user can store any of the data described herein associated with use of the content application 122 or the media content platform 104. In some examples, an account maintained by the media content platform 104 on behalf of the user can be mapped to, or otherwise associated with, the user profile. Such an account can be associated with a stored balance maintained by the media content platform 104. In some examples, a user profile can include historical group data, geographic data, customer preferences, subject matter preferences, transaction data, contacts data, social relationship data, user preferences, metadata tag data, and other information associated with participation in transactions and/or associated with use of the media content platform 104 described herein. Additional details associated with data that can be stored in association with user profiles are provided below, but may include the user-related data described herein as well as the user identifiers.

With respect to the prediction component 140, the client device 102 may be caused to display a user interface 120 provided by the media content platform 104. The user interface 120 may include various representations of various media content items 142. Just by way of example, the media content items 142 may correspond to songs that the media content platform 104 may provide to users that subscribe to or are otherwise associated with the media content platform 104. The user interface 120 may display selectable elements that each correspond to the media content items 142. For example, a user may search for songs by a certain artist, and the results of that search may be displayed on the user interface 120. The results may include the songs determined to be associated with the artist, and a selectable element may be displayed in association with each song from the search results. Other examples of media content items 142 displayed in a user interface 120 may include playlists, collections, mixes, individual media content items (e.g., in a player user interface), and so forth.

At this point, a user may select one or more of the selectable elements to cause the client device 102 to output the media content item(s) 142 that were selected. Generally, when user input data is received indicating a selection of a media content item 142, a request for data representing the media content item 142 may be sent to the media content platform 104, which identifies the data and sends an instance of the data representing the selected media content item 142 to the client device 102 sent the request. While in some instances this process may be relatively quick, in other instances the operations associated with sending the request, generating a response at the media content platform 104, searching for and finding the media content item 142, sending the response to the client device 102, and then the client device 102 interpreting and utilizing that response may be both time-intensive and computationally intensive for both the client device 102 and the media content platform 104.

To reduce use of computational resources as well as to promote savings in memory storage associated with the client device 102, among other benefits, the present disclosure describes the ability to predictively cache portions of media content items 142 on the client device 102 such that when the selectable elements for those media content items 142 are selected, and the portion of the media content item 142 cached in memory of the client device 102 is utilized to initiate output of the media content item 142 on the client device 102. The remainder of the media content item 142 can then be streamed from the media content platform 104, where initiation of the streaming process can be performed in parallel with output of the cached portion of the media content item 142. Pre-caching or pre-buffering predicted media content items 142 reduces the delay involved in requesting the media content item 142 in real time or near real time. Further the predicted items on the media content items 142 list may include more than one item to account for skipping, in other words, if the predicted item is skipped, another item is cached and available to be played instantaneously. By removing delay between skips, the user experience is improved.

To predict which media content items 142 may be selected, a determination may first be made as to which selectable elements representing media content items 142 are currently displayed on a user interface 120 or that were searched for by the user in question. In examples, determining which media content items 142 are likely to be selected may be based at least in part on historical use of the media content platform 104 by the user 101 and/or by other users having one or more similar attributes to the user 101. This historical data may be stored in the datastore(s) 130 and/or with respect to the account(s) 134 of the user 101. As such, even prior to the content application 122 being utilized in a given session by the user 101, media content item selection likelihoods may be determined. This initial process may parse the potentially millions of media content items 142 to several hundred or perhaps even just a few dozen or fewer options. Then, a likelihood of some or each of the media content items 142 being selected to be output by the client device 102 may be determined. In some cases, likelihoods of individual media content items may be based on relative locations of the media content items in a playlist (e.g., a first song in a playlist may have a higher likelihood than a last song in a playlist). The likelihoods of individual media content items may additionally, or alternatively, be based on relative locations as viewable in a user interface (e.g., media content items currently being viewed on a particular user interface having a higher likelihood than media content items that would be accessible after scrolling to a different portion of the user interface). In examples, the likelihood may be based at least in part on at least one of popularity of a given media content item 142 relative to other media content items 142 on the media content platform 104, a recency that the media content item 142 was played by the client device 102, a time at which the media content item 142 was released by the media content platform 104, or an association of the media content item 142 with a further media content item 142 that was previously played or is currently being played by the client device 102. In some cases, the prediction can be made based on a user's interaction with a merchant platform, a peer-to-peer platform or a financial platform. Alternatively or additionally, different portions of the media content item 142 may be cached based on the interaction and the platform (social networking platform, social networking platform while in a store, etc.) where the media content item 142 is being accessed.

Other input types may include, for example, indicators of activities that a user is involved in when the request for the media content item 142 is provided. For example, scheduling data and/or user input indicating user activities may be utilized to determine what activity the user is involved in or is likely to be involved in when the request for media content items 142 is received or when the user interface 120 is displayed on the client device 102. By way of example, a user may be engaged in the activity of exercising, and this activity may be more associated with given playlists, music genres, etc. In another example, the user may be engaged in a work-related activity, and this activity may be more associated with other playlists, music genres, etc.

Likewise, the device type of the client device 102 may evidence which media content items 142 are more likely to be selected over other media content items 142. For example, if the client device 102 is a desktop computer or laptop computer issued in relation to a work profile, such a device type may evidence that the device is utilized for work more frequently than for other purposes, and such use may be more associated with given playlists, music genres, etc. In other examples, the client device 102 may be a mobile device, a wearable device, or a device associated with a given purpose such as tracking health statistics, workout routines, etc. In this example, such a device type may be associated with other media content items 142. In some examples, the device types may be mapped to historical media content item usage to determine, for a given user or group of users, what media content items 142 or categories of media content items 142 have a higher likelihood to be utilized by a client device 102 of a given device type.

In still other examples, other applications being utilized by the client device 102 when the user interface 120 is enabled or when a content application 122 associated with the media content platform 104 is enabled may inform the likelihood of given media content items 142 being selected. For example, applications associated with work functions, Internet browsing, social media, etc. may be associated with historical selection of given media content items 142 or categories of media content items 142. As such, when certain applications are enabled on the client device 102, those applications may impact the likelihood that a given media content item 142 will be selected. Additional details on these data types and other data types that may be utilized by the prediction component 140 to determine likelihoods of media content items 142 being selected are provided with respect to FIG. 5, below.

In examples, an artificial intelligence model 136 may be generated and configured to determine the likelihoods of media content item selection. Additionally, one or more training datasets may be generated to train the artificial intelligence model 136 to predict selection of media content items 142. The training datasets may include any or all of the data described herein, including feedback data indicating whether previously-predicted media content items were in fact selected by a user of the client device 102 or other users of other client devices 102. Thereafter, a trained artificial intelligence model 136 may be generated and utilized to predict whether given media content items will be selected. Additional details on the use of artificial intelligence models for determining media content item selection likelihoods are provided with respect to FIG. 3, below.

When the likelihoods of media content item selection have been determined, the media content items 142 may be ranked based at least in part on the likelihoods, with the higher-likelihood media content item 142 being ranked more favorably than other media content items 142 with lower likelihoods of selection. Thereafter, a given number of media content items 142 may be selected for caching utilizing the ranking. In some examples, the higher-likelihood media content item 142 may be cached. In other examples, a given number of the highest ranked media content items 142 may be cached. The artificial intelligence models 136 described herein may be utilized to determine, for a given client device 102, how many media content items 142 are to be selected for caching as described herein.

Thereafter, the client device 102 may cache a portion of the media content item(s) 142 that were predicted to be selected in memory of the client device 102 without caching the media content item(s) 142 that were predicted to be less likely to be selected (e.g., prior to selection of a selectable element in the user interface by the user). This process may include querying the media content platform 104 for the portion of the media content item(s) 142, receiving data representing the portion of the media content item(s) 142, and caching the portions of the media content item(s) 142 in memory of the client device 102.

During these caching operations, the user interface 120 displaying the selectable elements corresponding to the media content items 142 may still be displayed to the user and the user may determine which media content item 142 to select. The client device 102 may receive user input indicating a selection of the representation of the media content item 142 in the user interface 120 and may generate corresponding user input data indicating the selection. Based at least in part on receiving the selection of the representation of the media content item 142, the client device 102 may surface the portion of the media content item 142 cached in the memory of the client device 102 instead of media content items 142 that were not selected without additional user intervention. The media content item 142 that was selected may start being output by the client device 102, and while the media content item 142 is being output, the client device 102 may send a request to the media content platform 104 to stream a remaining portion of the media content item 142 other than and/or in addition to at least some of the cached portion.

In this example, feedback data may be generated based at least in part on the media content item 142 that was selected by the user. In the example above, the user selected a media content item 142 that was predicted to be selected and that was cached in memory of the client device 102. This positive feedback data may be utilized to determine that the trained artificial intelligence model 136 properly predicted that the media content item 142 would be selected. In other examples, the feedback data may indicate that the selected media content item 142 was not an item that was partially cached because the item was predicted to be less likely to be selected than other media content items 142. In this example, the feedback data may be utilized to train the artificial intelligence model 136 as a negative data set. This may result in utilizing different data or factors to determine subsequent likelihoods, utilizing different weightings for such factors, or to alter the number of media content items 142 to partially cache such as in situations where the selected item was ranked near a determined cutoff of items that were cached.

In some examples, a given number, say for example 5, of the higher-likelihood media content items 142 may be partially cached in memory of the client device 102. Over time, the user may select media content items 142 which may be items from the 5 higher-likelihood items or other items. If the user selections are typically the top 1, 2, or 3 higher-likelihood items, for example, the artificial intelligence model 136 may determine that only 3 or perhaps 4 of the higher-likelihood media content items 142 should be cached in the client device 102 memory. Thereafter, that threshold number of media content items 142 may be reduced to 3 or 4 such that memory is saved on the client device 102 in question but the benefits of predictive content caching is maintained. Additionally, instead of saving on memory storage by reducing the number of cached partial media content items 142, the portion of each stored media content item may be increased. For example, if 10 seconds of the top 6 higher-likelihood media content items 142 was previously stored (a total of 60 seconds of content), and the feedback data indicates the top 3 items are frequently selected, the number of media content items to be partially stored may be reduced to 3 items but 20 seconds of each item may be stored instead of 10 seconds of each item.

Further, the number of items to be cached, and/or the duration of the cached portion, may change based on a particular user interface being displayed. For example, a user may frequently play a first playlist that includes songs from animated movies when in the car with children of the user. The user in this example may alternate between starting the playlist from the beginning and starting the playlist from one of the children's favorite songs in the middle of the playlist. Accordingly, the artificial intelligence model may determine that the first song and the song in the middle of the playlist have a higher likelihood to be played from the first playlist, and cache the initial portions of these two songs when the user interface corresponding to the first playlist is being displayed. The user may have another playlist that is played while working out which the user likes to start from various different songs. When the user interface associated with the second playlist is displayed, the artificial intelligence model may determine that more than the beginnings of two songs should be cached, such as the beginnings of 5 songs that have been the least recently played. In another example, the portion selected or recommended may be based on user interaction with the song, or similar songs, on another platform, e.g., on a social networking platform or a streaming platform where the user may have used the song as a background score for a video. In one embodiment, a first portion is approximately the first ten seconds of the song because ten seconds of pre-buffering aligns with royalty requirements such that if the user skips before the ten seconds pre-buffered portion is played, a royalty is not accessed for listening to the song. In addition, avoiding of downloading the entire next song conserves bandwidth and memory.

With respect to the duration of the cached portion of a given media content item 142, the prediction component 140 may utilize various data types and/or may utilize artificial intelligence modeling to determine portion(s) of media content item(s) for caching. These data types may include, by way of example, connectivity data, prior caching data, location data, device data, application version(s), content type(s), selection likelihood data, prior artificial intelligence results, and/or other data types. Additional details on determining the duration of the cached portion of a given media content item 142 are provided with respect to FIG. 6, below.

Additionally, when a user interacts with the user interface 120 as described herein, the media content platform 104 may receive a request for media content at the client device 102. In response, the media content platform 104 may provide the user interface 120 for display by the client device 102 and playback information for the media content item 142 that was requested. In these examples, both the request and the playback information may be cached at the client device 102. Thereafter, a similar request may be received at the media content platform 104 and from the client device 102, and the playback information included in the prior response may be utilized when the request is received subsequent times without sending another request to the media content platform 104.

In examples, the user interfaces 120 described herein may be described as displaying functionality to allow for user interaction. That functionality may be provided utilizing one or more interactive elements. The interactive element component 132 may generate these interactive elements that may be configured to be shared and displayed in the content application 122 and outside of the content application 122, such as on one or more social media applications, email applications, messaging applications, merchant applications, etc. The interactive element can correspond to a link, a deep link, a bar code, a QR code, or any other element that is capable of interaction. In some examples, the interactive element can have data embedded therein to trigger certain functionality, such as the display of information and/or the selection of media content items. The functionality may be particularly robust and may update on-the-fly to provide users with real-time information and/or options associated with the media content platform 104.

Figure 2:
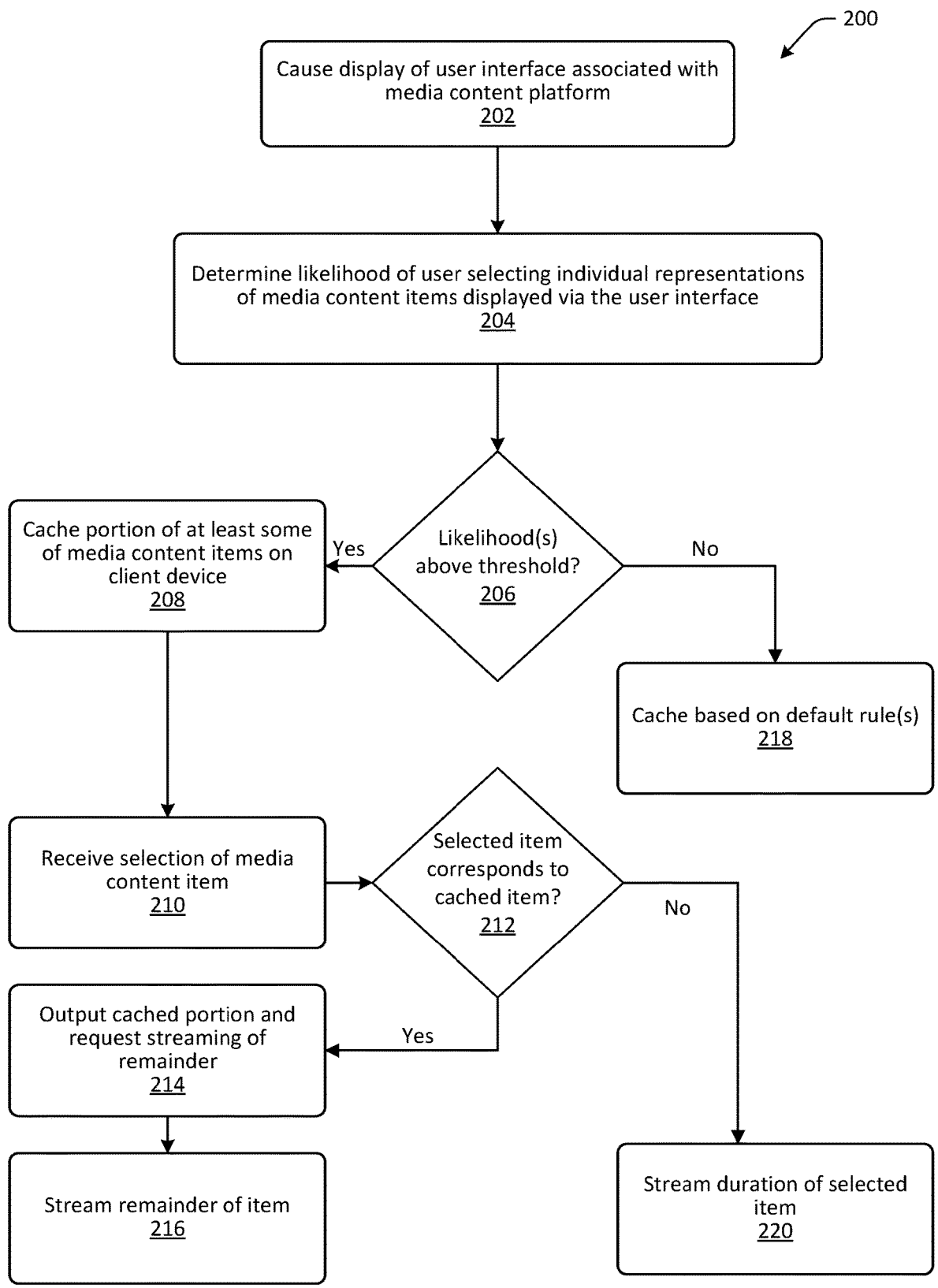
FIG. 2 is a flow diagram of an example process for utilizing artificial intelligence techniques in association with predictive media caching, according to an embodiment described herein.
Figure 3:
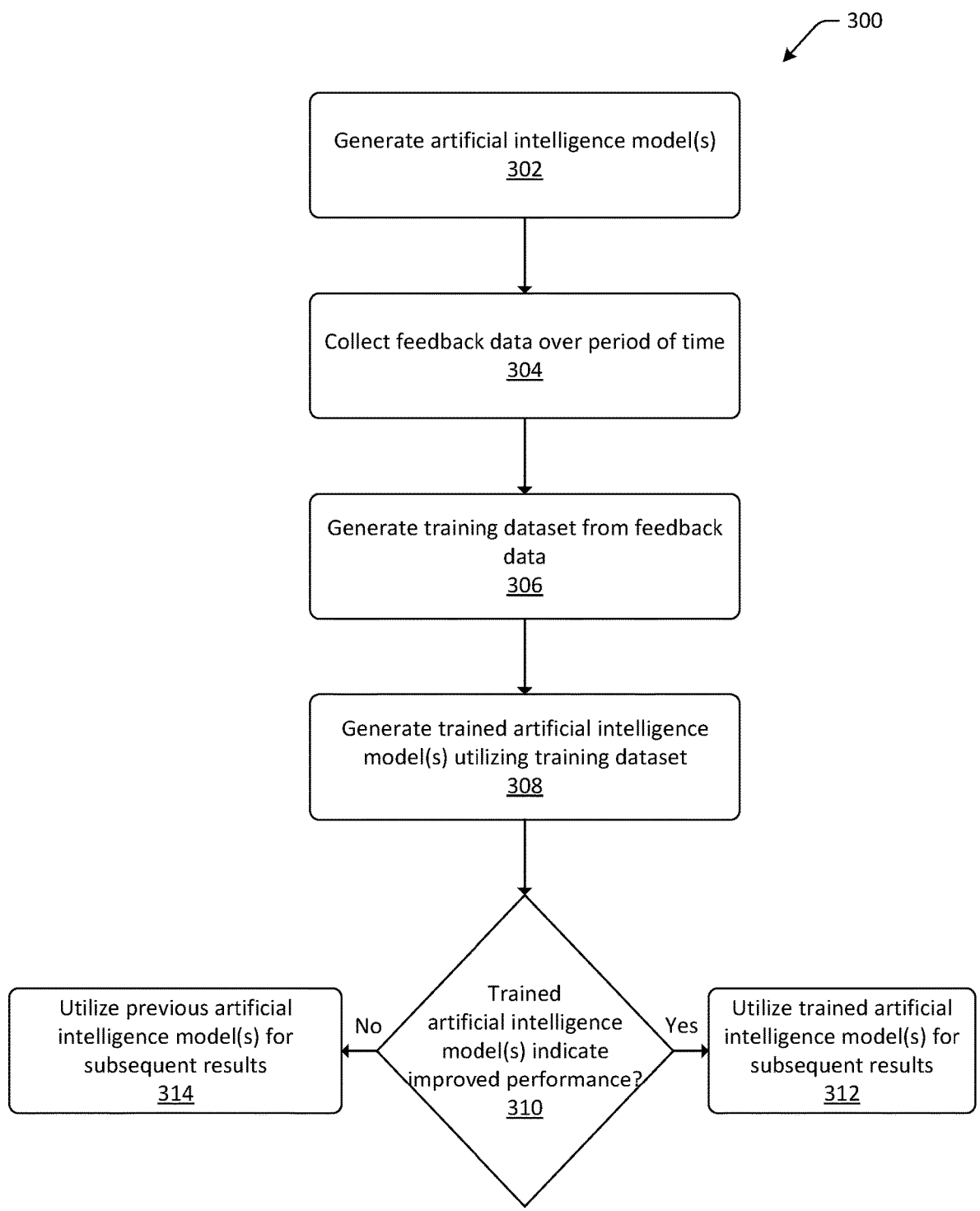
FIG. 3 is a flow diagram of an example process for predictive media caching, according to an embodiment described herein.

FIGS. 2 and 3 include example processes for predictive content caching, according to an embodiment described herein. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1 and 4-14, although the processes may be implemented in a wide variety of other environments, architectures and systems.

FIG. 2 is a flow diagram of an example process 200 for utilizing artificial intelligence techniques in association with predictive media caching. In some examples, use of artificial intelligence techniques in association with predictive media caching may be performed by a prediction component 140 as described with respect to FIG. 1. The order in which the operations or steps are described is not intended to be construed as a limitation, and any number of the described operations may be combined in any order and/or in parallel to implement process 200.

At block 202, the process 200 may include causing display of a user interface associated with the media content platform. For example, a client device may be caused to display a user interface provided by a media content platform. The user interface may include various representations of various media content items. Just by way of example, the media content items may correspond to songs that the media content platform may provide to users that subscribe to or are otherwise associated with the media content platform. The user interface may display selectable elements that each correspond to the media content items. For example, a user may search for songs by a certain artist, and the results of that search may be displayed on the user interface. The results may include the songs determined to be associated with the artist, and a selectable element may be displayed in association with each song from the search results.

At block 204, the process 200 may include determining likelihoods of a user selecting individual representations of media content items as displayed via the user interface. In examples, the likelihood may be based at least in part on at least one of popularity of a given media content item relative to other media content items on the media content platform, a recency that the media content item was played by the client device, a time at which the media content item was released by the media content platform, or an association of the media content item with a further media content item that was previously played or is currently being played by the client device.

Other input types may include, for example, indicators of activities that a user is involved in when the request for the media content item is provided. For example, scheduling data and/or user input indicating user activities may be utilized to determine what activity the user is involved in or is likely to be involved in when the request for media content items is received or when the user interface is displayed on the client device. By way of example, a user may be engaged in the activity of exercising, and this activity may be more associated with given playlists, music genres, etc. In another example, the user may be engaged in a work-related activity, and this activity may be more associated with other playlists, music genres, etc.

Likewise, the device type of the client device may evidence which media content items are more likely to be selected over other media content items. For example, if the client device is a desktop computer or laptop computer issued in relation to a work profile, such a device type may evidence that the device is utilized for work more frequently than for other purposes, and such use may be more associated with given playlists, music genres, etc. In other examples, the client device may be a mobile device, a wearable device, or a device associated with a given purpose such as tracking health statistics, workout routines, etc. In this example, such a device type may be associated with other media content items. In some examples, the device types may be mapped to historical media content item usage to determine, for a given user or group of users, what media content items or categories of media content items have a higher likelihood to be utilized by a client device of a given device type.

In still other examples, other applications being utilized by the client device when the user interface is enabled or when a content application associated with the media content platform is enabled may inform the likelihood of given media content items being selected. For example, applications associated with work functions, Internet browsing, social media, etc. may be associated with historical selection of given media content items or categories of media content items. As such, when certain applications are enabled on the client device, those applications may impact the likelihood that a given media content item will be selected.

In examples, an artificial intelligence model may be generated and configured to determine the likelihoods of media content item selection. Additionally, one or more training datasets may be generated to train the artificial intelligence model to predict selection of media content items. The training datasets may include any or all of the data described herein, including feedback data indicating whether previously-predicted media content items were in fact selected by a user of the client device or other users of other client devices. Thereafter, a trained artificial intelligence model may be generated and utilized to predict whether given media content items will be selected.

Further, the number of items to be cached, and/or the duration of the cached portion, may change based on a particular user interface being displayed. For example, a user may frequently play a first playlist that includes songs from animated movies when in the car with children of the user. The user in this example may alternate between starting the playlist from the beginning and starting the playlist from one of the children's favorite songs in the middle of the playlist. Accordingly, the artificial intelligence model may determine that the first song and the song in the middle of the playlist have a higher likelihood to be played from the first playlist, and cache the initial portions of these two songs when the user interface corresponding to the first playlist is being displayed. The user may have another playlist that is played while working out which the user likes to start from various different songs. When the user interface associated with the second playlist is displayed, the artificial intelligence model may determine that more than the beginnings of two songs should be cached, such as the beginnings of 5 songs that have been the least recently played. In another example, the portion selected or recommended may be based on user interaction with the song, or similar songs, on another platform, e.g., on a social networking platform or a streaming platform where the user may have used the song as a background score for a video. In one embodiment, a first portion is approximately the first ten seconds of the song because ten seconds of pre-buffering aligns with royalty requirements such that if the user skips before the ten seconds pre-buffered portion is played, a royalty is not accessed for listening to the song. In addition, avoiding of caching the entire next song conserves bandwidth and memory.

When the likelihoods of media content item selection have been determined, the media content items may be ranked based at least in part on the likelihoods, with the higher-likelihood media content item being ranked more favorably than other media content items with lower likelihoods of selection. Thereafter, a given number of media content items may be selected for caching utilizing the ranking. In some examples, only the higher-likelihood media content item may be cached. In other examples, a given number of the highest ranked media content items may be cached. The artificial intelligence models described herein may be utilized to determine, for a given client device, how many media content items are to be selected for caching as described herein.

At block 206, the process 200 may include determining whether the one or more likelihoods are above a threshold likelihood. For example, the threshold may be that a given likelihood of a media content item being selected must be above a certain level, such as 50%. In other examples, the threshold may be a certain number of higher-likelihood media content items to be selected. In several other examples, the threshold likelihood may be that the likelihood for a given media content item differs from a likelihood of another media content item associated with the user in question.

In examples where at least one of the likelihoods are above the threshold likelihood, the process 200 may include, at block 208, caching a portion of the media content items above the threshold likelihood. For example, the client device may cache a portion of the media content item(s) that were predicted to be selected in memory of the client device without caching the media content item(s) that were predicted to be less likely to be selected. This process may include querying the media content platform for the portion of the media content item(s), receiving data representing the portion of the media content item(s), and caching the portions of the media content item(s) in memory of the client device.

At block 210, the process 200 may include receiving a selection of a representation of a media content item via the user interface. For example, a user may provide user input that selects one of the representations of the media content items as displayed via the user interface. In examples, the user input may be in the form of a touch input to the user interface and/or may be audio input in the form of a voice command provided by the user.

At block 212, the process 200 may include determining whether the selected item corresponds to one of the cached items. For example, an identifier of the media content item may be utilized to determine if the selected media content item corresponds to one of the media content items where a portion thereof was cached. To do so, the media content platform may store data indicating which media content items have a portion thereof cached with respect to a given user device (having a given user device identifier) and may reference the stored list of cached media content items against an identifier of the selected item to determine if the selected item corresponds to at least one of the cached media content items.

In examples where the selected item corresponds to a cached item, the process 200 may include, at block 214, outputting the cached portion of the media content item while requesting to stream the remainder of the media content item from the media content platform. For example, the cached portion of the media content item may be the first 10-20 seconds of the item and the cached portion may be utilized to start outputting the media content item on the client device. While the cached portion is being output, the client device may query the media content platform for the content item itself and/or at least a portion of the remainder of the media content item, and the media content platform may begin to stream data representing the item to the client device. In other words, the client device may hand off playback from the cached version to the streaming version when the streaming version is received at the client device and/or is determined to be sufficiently buffered at the client device for playback.

At block 216, the process 200 may include streaming the remainder of the media content item from the media content platform. For example, once the data representing the media content item is received from the media content platform by streaming the content to the client device, the client device may execute the handoff of playback from the cached version to the streamed data to output the remainder of the item.

Returning to block 206, in examples where at least one likelihood is not above the threshold, the process 200 may include, at block 218, performing caching based at least in part on one or more default rules. In this example, the likelihoods of selecting particular media content items did not meet the thresholds described herein. However, given that media content item caching may still be beneficial, one or more default rules may be applied to determine which media content items to at least partially cache. Those default rules may include, a given number of media content items on a playlist, a given number of most frequently selected media content items, media content items associated with user preferences, recommended media content items, and the like.

Returning to block 212, in examples where the selected item does not correspond to the cached item, the process 200 includes streaming the duration of the media content item from the media content platform.

FIG. 3 is a flow diagram of an example process 300 for predictive media caching. In some examples, predictive media caching may be performed by a prediction component 140 as described with respect to FIG. 1. The order in which the operations or steps are described is not intended to be construed as a limitation, and any number of the described operations may be combined in any order and/or in parallel to implement process 300.

At block 302, the process 300 may include generating one or more artificial intelligence models. In examples, as described above, the artificial intelligence models may be utilized to, among other things, predict which of several media content items may be selected by a given user. For example, the artificial intelligence models may utilize predictive analytic techniques, which may include, for example, predictive modeling, machine learning, and/or data mining. Generally, predictive modeling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models described herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, such as the datastore(s) 130, and may be utilized to predict trends and behavior patterns associated with media content item selection. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modeling may be performed to generate accurate predictive models.

At block 304, the process 300 may include collecting feedback data over a period of time. The feedback data may include any of the data described with respect to the datastore(s) 130, any data associated with any of the resources described herein, any data described with respect to FIGS. 1, 2, and 4-14, or any other data that may be utilized to perform the operations described herein. In examples, the feedback data may include data associated with interactions of a user with a media content platform, a content application, or data associated with interactions of other users with the media content platform or the content application. Other resources that the feedback data may be received from may include, for example, a loyalty program resource, a coupon resource, a promotions resource, an appointment scheduling resource, a feedback resource associated with customer feedback, an order-ahead resource associated with customers ordering items prior to when the items are available for purchase, an order tracking resource, a digital receipt resource, a purchase history resource, a user check-in resource associated with users providing input data for checking in to a service, an invoice resource, etc.

At block 306, the process 300 may include generating a training dataset from the feedback data. Generation of the training dataset may include formatting the feedback data into input vectors for the artificial intelligence model to intake, as well as associating the various data with the outcomes of the interactions with the media content platform described herein. The feedback data may indicate an accuracy of prior media content item selection likelihoods and prior media content item selections, an accuracy or desirability of user interface interactions, etc.

At block 308, the process 300 may include generating one or more trained artificial intelligence models utilizing the training dataset. Generation of the trained artificial intelligence models may include updating parameters and/or weightings and/or thresholds utilized by the models to determine the likelihoods described herein, the thresholds described herein, and/or any other determination associated with predictive media caching as described herein based at least in part on the data from the training dataset.

At block 310, the process 300 may include determining whether the trained artificial intelligence models indicate improved performance metrics. For example, a testing group may be generated where the outcomes of the media content item selections are known but not to the trained artificial intelligence models. The trained artificial intelligence models may generate results, which may be compared to the known results to determine whether the results of the trained artificial intelligence model produce a superior result than the results of the artificial intelligence model prior to training. For example, the results of predicting media content items selected as determined by the trained artificial intelligence model may be compared to results of predicting media content items selected as determined by the artificial intelligence model prior to the training operations to determine whether the trained artificial intelligence model more accurately predicted which media content items would be selected than the artificial intelligence model prior to training.

In examples where the trained artificial intelligence models indicate improved performance metrics, the process 300 may include, at block 312, utilizing the trained artificial intelligence models for generating subsequent results, including for predicting selections of media content items. For example, the trained artificial intelligence models may be utilized to generate interactive elements as described herein, to determine selection likelihoods as described herein, to determine caching thresholds as described herein, etc. Additionally, the trained artificial intelligence models may be utilized to adjust or recommend adjusting user preferences or condition thresholds as described herein. It should be understood that the trained artificial intelligence models may be utilized in any scenario where models are utilized as described herein.

In examples where the trained artificial intelligence models do not indicate improved performance metrics, the process 300 may include, at block 314, utilizing the previous iteration of the artificial intelligence models for generating subsequent results. For example, instead of utilizing the trained artificial intelligence model(s), the previously-generated artificial intelligence models as described with respect to block 302 may be utilized. Thereafter, additional training datasets may be generated and utilized to generate subsequently trained artificial intelligence models to determine if such models improve performance metrics associated with selection of media content items. The operations described with respect to FIG. 3 may be utilized to generate the artificial intelligence models 136 described with respect to FIG. 1.

Figure 4:
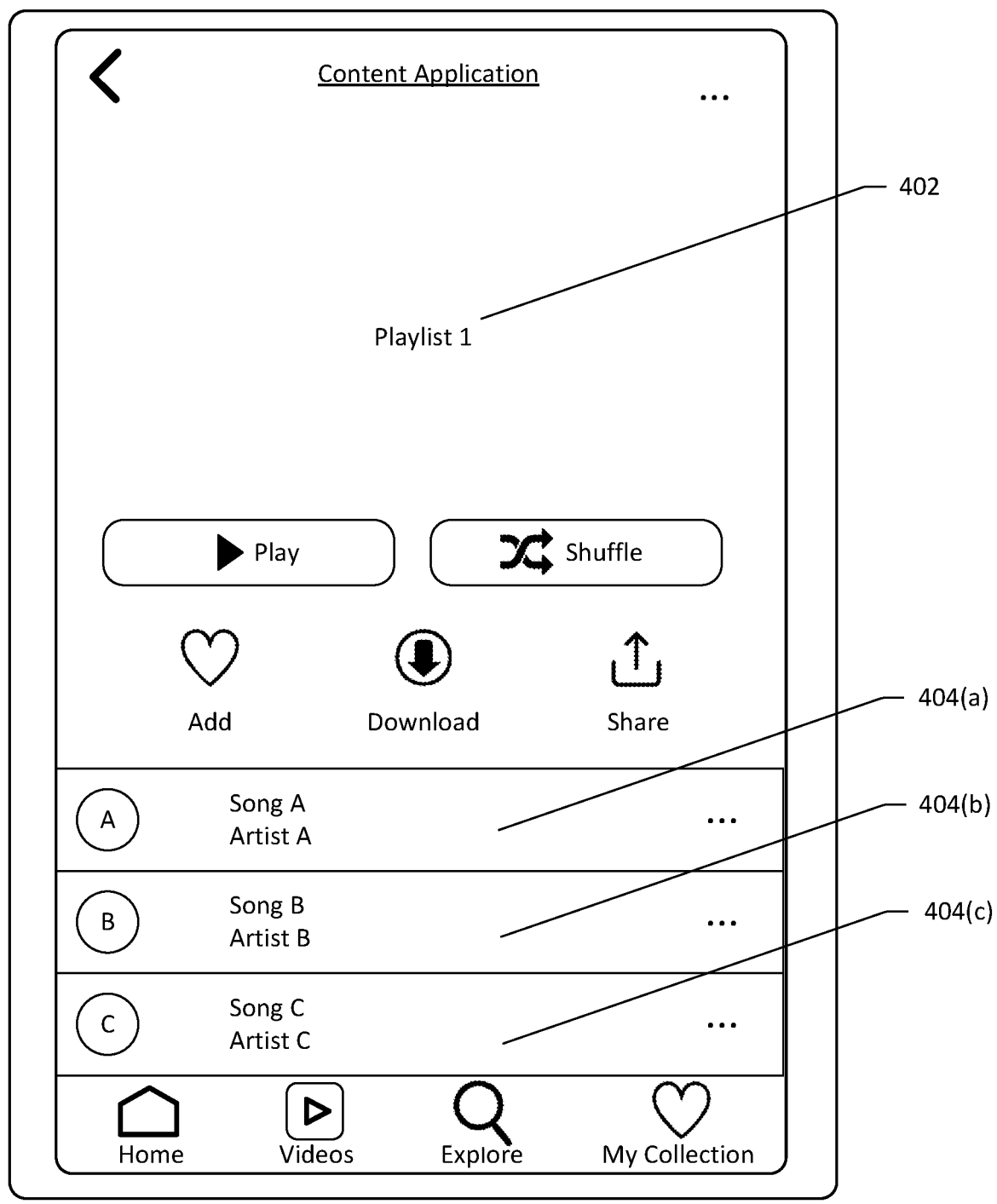
FIG. 4 is a conceptual diagram showing user interfaces and system components utilized for predictive media caching, according to an embodiment described herein.

FIG. 4 is a conceptual diagram showing user interfaces and system components utilized for predictive media caching. The user interfaces may be the same or similar to the user interfaces 120 described with respect to FIG. 1.

In examples, the user interfaces described with respect to FIG. 4 may be associated with a content application, such as the content application 122 described with respect to FIG. 1. In examples, the user interface may include one or more functionalities that may allow a user of a client device on which the user interface is displayed to provide user input data and to view information associated with media content items. For example, the user interface may include an indicator of subject matter that is currently displayed on the client device. As shown in FIG. 4, a user may have created a playlist 402 of media content items. The playlist 402 may include representations of media content items 404(a)-(c). It should be understood that while the playlist 402 from FIG. 4 includes three media content items 404(a)-(c), any playlist may include any number of media content items. Additionally, there may be one or more than one playlist associated with a given user account.

The user interface may also display additional functionality, including a play button that when selected may cause the content application to initiate output of audio or video associated with the media content items 404(a)-(c) from the playlist 402. The user interface may also include a shuffle button configured to cause output of the media content items 404(a)-(c) in a randomized order. Additional functionality may include an add button to add media content items to the playlist 402, a download button configured to cause a given media content item or the playlist 402 of media content items 404(a)-(c) to be downloaded to the client device, or a share button configured to allow the user to share the playlist 402 with another user account, among others.

As described in more detail with respect to FIG. 1, at a given point in time the user interface may display certain representations of media content items 404(a)-(c), and those displayed media content item representations may be utilized as candidate media content items for predictive caching. In the example of FIG. 4, Song A, Song B, and Song C are currently associated with displayed representations of those media content items 404(a)-(c). From these options, a prediction component, such as the prediction component 140 described with respect to FIG. 1, may perform operations to determine which of the media content items 404(a)-(c) to partially cache at the client device in anticipation of the user selecting at least one of the media content items 404(a)-(c).

In addition to the above, the user interface described with reference to FIG. 4 may include a home button configured to cause the user interface to display a home screen associated with the user account. Additionally, a home button may be displayed and may be configured to cause representations of one or more video content items to be displayed for selection by the user. An explore button may be presented and may allow the user to search for media content items or be presented with media content items that the media content platform has determined to be relevant to the user account. The user interface may also include a "my collection" button that may be utilized to display media content items that the user account has saved, liked, added, downloaded, etc.

Figure 5:
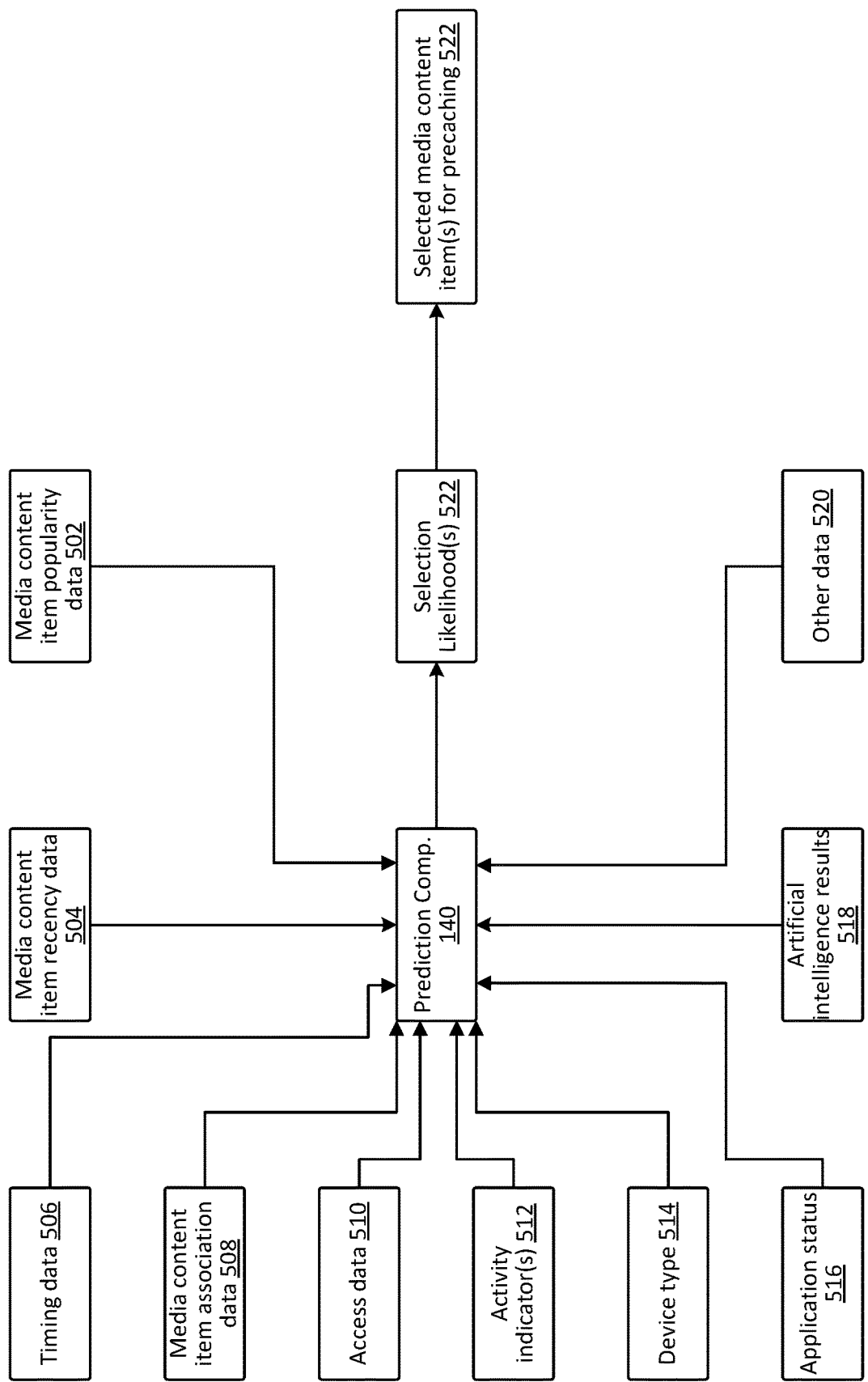
FIG. 5 is a conceptual diagram showing example data and components that may be utilized to determine likelihoods that media content item(s) will be requested for output by a client device, according to an embodiment described herein.

FIG. 5 is a conceptual diagram showing example data and components that may be utilized to determine likelihoods that media content item(s) will be requested for output by a client device, according to examples described herein. FIG. 5 may include at least some of the same components described with respect to FIG. 1, above. For example, FIG. 5 may include a prediction component 140 that may be the same as or similar to the prediction component 140 described with respect to FIG. 1.

In the example of FIG. 5, the prediction component 140 may be configured to intake some or all of the data types depicted in FIG. 5 and utilize the data types to determine one or more likelihoods that media content item(s) will be selected to be output by a client device, such as the client device 102 described with respect to FIG. 1. The data types may include, for example, media content item popularity data 502, media content item recency data 504, timing data 506, media content item association data 508, access data 510, activity indicator(s) 512, device type 514, application status 516, artificial intelligence results 518, and/or other data 520. Each of these data types is described in detail below.

For example, the media content item popularity data 502 may include data that indicates popularity of a given media content item relative to other media content items on the media content platform. In an example, a first media content item may be, at a given time, considered more popular than a second media content item because the first media content item is selected for output by the user and/or by one or more other users more frequently than the second media content item. The media content item popularity data 502 may also be generated from external sources of data indicating media content item popularity, such as views, comments, likes from social media platforms, awards and/or nominations information, news coverage of the media content item, and/or the like. The media content item recency data 504 may include data indicating a recency that the media content item was played by the client device and/or user account. For example, a first media content item may have been selected for output on the client device more recently than a second media content item. The media content item recency data 504 may also be based at least in part on a recency at which a playlist, album, artist, etc. that is associated with a given media content item is selected (for output or otherwise) on the client device and/or by the user account. The media content item recency data 504 may also include data indicating when the given media content item was accessed on another platform, e.g., a streaming platform, a social network platform, and the like.

The timing data 506 may include data indicating a time at which a given media content item was released by a media content platform and/or was otherwise made available for selection on the media content platform. Utilizing songs as a media content item example, some songs have been available for selection on the media content platform for days, weeks, months, years, and/or decades. Other songs may have just been made available on the day in question. Data indicating when such media content items are made available for selection on the client device may be considered the timing data 506. The media content item association data 508 may include data indicating an association of the media content item in question with one or more other media content items that were previously output or are currently being output by the client device. For example, some media content items may be associated with each other such as in a playlist, an album, based on the artist and/or creator of the media content items, a collaboration between the artist and one or more other artists, etc. These associations may be identified and utilized as media content item association data 508. The access data 510 may include data indicating prior access of the media content item in question on the client device and/or by the user account. For example, a given user may utilize the media content platform via the client device over a period of time, say for example for a year. In this example, the user may select multiple media content items for output over the period of time. When these media content items are accessed on the client device and/or by the user account, access data 510 may be generated indicating which media content items were accessed and/or when those media content items were accessed.

The activity indicator(s) 512 may include, for example, indicators of activities that a user is involved in when the request for the media content item is provided. For example, scheduling data and/or user input indicating user activities may be utilized to determine what activity the user is involved in or is likely to be involved in when the request for media content items is received or when the user interface is displayed on the client device. By way of example, a user may be engaged in the activity of exercising, and this activity may be more associated with given playlists, music genres, etc. In another example, the user may be engaged in a work-related activity, and this activity may be more associated with other playlists, music genres, etc.

The device type 514 may evidence which media content items are more likely to be selected over other media content items. For example, if the client device is a desktop computer or laptop computer issued in relation to a work profile, such a device type may evidence that the device is utilized for work more frequently than for other purposes, and such use may be more associated with given playlists, music genres, etc. In other examples, the client device may be a mobile device, a wearable device, or a device associated with a given purpose such as tracking health statistics, workout routines, etc. In this example, such a device type may be associated with other media content items. In some examples, the device types may be mapped to historical media content item usage to determine, for a given user or group of users, what media content items or categories of media content items have a higher likelihood to be utilized by a client device of a given device type. The device type 514 may also include device accessories that are connected (e.g., via a wired or wireless connection) that may indicate a context of the user, such as listening on headphones, on a portable speaker, on a generally non-portable speaker, etc.

The application status 516 may indicate a status of other applications being utilized by the client device when a user interface associated with the media content platform is enabled or when a content application associated with the media content platform is enabled. For example, applications associated with work functions, Internet browsing, social media, etc. may be associated with historical selection of given media content items or categories of media content items. As such, when certain applications are enabled on the client device, those applications may impact the likelihood that a given media content item will be selected.

The artificial intelligence results 518 may indicate media content item selection based on artificial intelligence processing. In examples, an artificial intelligence model may be generated and configured to determine the likelihoods of media content item selection. Additionally, one or more training datasets may be generated to train the artificial intelligence model to predict selection of media content items. The training datasets may include any or all of the data described herein, including feedback data indicating whether previously-predicted media content items were in fact selected by a user of the client device or other users of other client devices. Thereafter, a trained artificial intelligence model may be generated utilizing the training dataset and the trained artificial intelligence model may be used to predict whether given media content items will be selected.

Additionally, the other data 520 may be any data that can be utilized by the prediction component 140 to determine likelihoods that media content item(s) will be selected for output on a given client device. It should be understood that this other data 520 may include any data that is available to the media content platform and/or that becomes available to the media content platform over time.

As described in more detail with respect to FIG. 1, some or all of the data types described with respect to FIG. 5 may be utilized by the prediction component 140 to determine which media content item(s) have a higher likelihood to be selected on a given client device. These selection likelihoods 522 may indicate different likelihoods of media content item selection as between given media content items and/or may rank the media content items based at least in part on how likely the media content items are to be selected. A threshold and/or other metric may be established for determining which of the selection likelihoods 522 are sufficient and selected media content item(s) for precaching 524 may be determined. At least a portion of these selected media content item(s) 524 may be cached in memory of the client device as described in more detail elsewhere herein.

In addition to the above, the models utilized to predict likelihoods that media content items will be selected may also be utilized for one or more other purposes. For example, the trained models described herein may be utilized to determine what selections (whether of media content items or otherwise) that a given user and/or category of user is likely to make. This information may be utilized to generate a lean-back version of the content application and/or otherwise a version of the content application with functionality geared toward the likely selections and omitting at least some functionality of the full content application. This too may save computing resources including data storage and processing power to operate the lean-back version of the content application.

Figure 6:
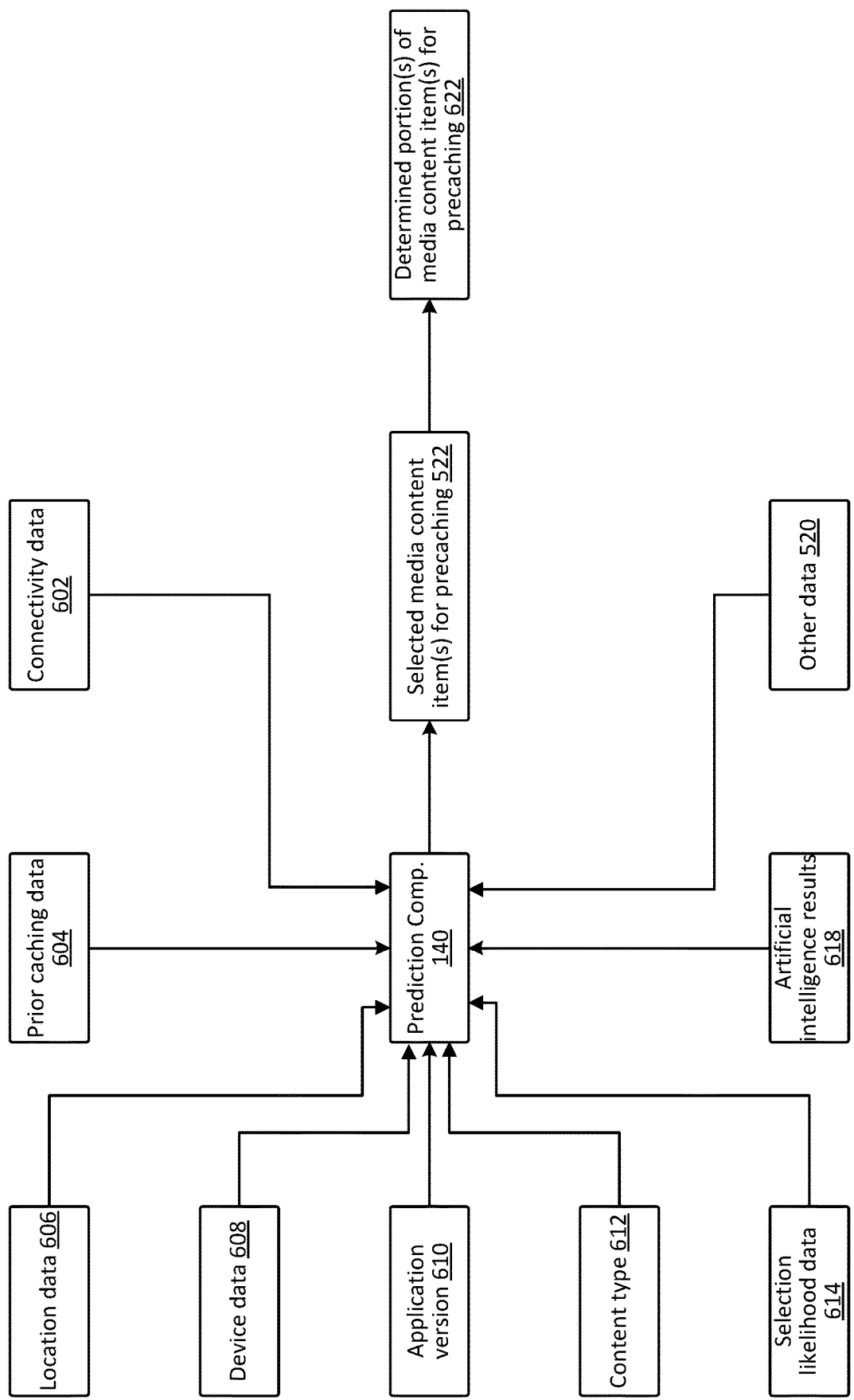
FIG. 6 is a conceptual diagram showing example data and components that may be utilized to determine which portion(s) of media content item(s) are to be cached, according to an embodiment described herein.

FIG. 6 is a conceptual diagram showing example data and components that may be utilized to determine which portion(s) of media content item(s) are to be cached, according to an embodiment described herein. FIG. 6 may include at least some of the same components described with respect to FIG. 1, above. For example, FIG. 6 may include a prediction component 140 that may be the same as or similar to the prediction component 140 described with respect to FIG. 1.

As illustrated in FIG. 6, the prediction component 140, in addition to determining which of several media content items are to be selected for caching, may also determine which portion of these media content items is to be cached. For example, a given media content item (such as a song) may include audio data that is, say, 3 minutes in length. Anywhere between a fraction of a second and all 3 minutes of the audio data may be cached in memory of the client device. However, optimally in at least some examples, a given portion of the audio data should be cached to allow for near immediate output of corresponding audio while streaming of the remaining audio is established with the media content platform. However, if an excess of the audio data is cached beyond a duration to initiate playback and establish the playback stream from the remote server, caching of excess data may negatively impact memory and/or processing of the client device. To determine which portion of a given media content item is to be cached, the prediction component 140 may intake one or more data types as shown in FIG. 6, by way of example. Those data types (which may also be described as attributes, and may specifically include attributes of prior communications between the client device in question and the media content platform) may include connectivity data 602, prior caching data 604, location data 606, device data 608, application version 610, content type 612, selection likelihood data 614, artificial intelligence results 618, and/or other data 520. Each of these data types is described by way of example below.

With respect to the connectivity data 602, this may include any data that indicates connection performance as between the client device and the media content platform. For example, the connectivity data 602 may indicate whether a wireless connection is established between the client device and the media content platform, how frequently wireless connections are interrupted and/or dropped with respect to the client device, whether more than one connection means (e.g., wireless access point, local area network, etc.) is present, internet service provider information, and the like. The prior caching data 604 may include data indicating prior determination of how much given media content items were previously cached and/or feedback data indicating whether such prior caching indicated an excess of the media content items was cached and/or whether an insufficient amount of the media content items was cached (e.g., playback of the media content item was paused to accommodate the handoff at the end of the cached portion and prior to sufficient data received at the client device for streaming playback).

The location data 606 may indicate a location of the client device with respect to a given environment and/or generally (such as by utilizing global positioning system sensors). This location data 606 may indicate how likely it is that the client device will be able to reliably communicate with the media content platform and/or how the client device may be able to process user input data when received. The device data 608 may include any data that indicate capabilities of the client device being utilized, including processing power, memory availability, network access capabilities, user input means, output means, and the like.

The application version 610 may indicate a version of the content application being utilized by the client device to access media content items. In examples where the version is the up-to-date version, this may result in optimal communications between the content application and the media content platform. When the version is a prior version, issues when communicating between the content application and the media content platform may occur. This may impact the media content platform's ability to provide selected media content items to the client device quickly and thus may increase the use of cached media content items. The content type 612 may indicate whether the media content item in question includes text data, audio data, and/or image data. When the content type 612 indicates multimedia content (e.g., audio data and image data), synchronization of output of this data may add to the latency of initial and/or continued output and thus may result in more of the media content item being cached than other content types 612, for example.

The selection likelihood data 614 may correspond to the selection likelihood(s) 522 described with respect to FIG. 5. These selection likelihood(s) 522 may indicate how likely a given media content item is to be selected for output on the client device. In examples where the given media content item is more likely than another media content item to be selected, the more likely media content item may have a larger portion thereof cached than the less likely media content item, in examples. The artificial intelligence results 616 may correspond to the artificial intelligence results 518 described with respect to FIG. 5. The other data 520 is described in more detail above with respect to FIG. 5.

As described in more detail with respect to FIG. 1, some or all of the data types described with respect to FIG. 6 may be utilized by the prediction component 140 to determine which portion of the selected media item(s) for precaching 524 should be cached in memory of the client device in question. The determined portions of the media content items for precaching 622 may be the same as between multiple media content items and/or may be specific to each and/or some of the media content items. Additionally, the determination of which portions of media content items should be cached may be performed periodically, on a schedule, or otherwise repeatedly to dynamically determine which portions should be cached.

Figure 7A:
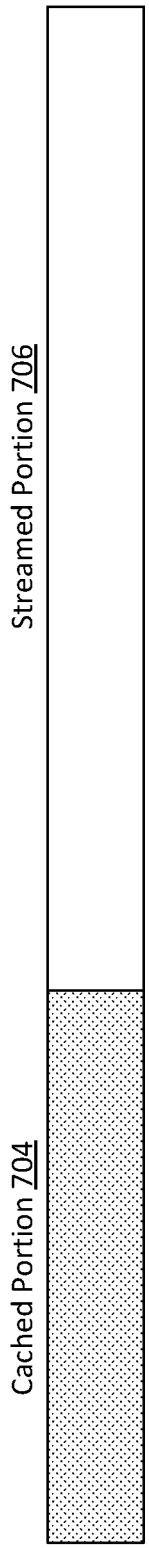
FIG. 7A is a conceptual diagram of a representation of a media content item with a cached portion and a streamed portion, according to an embodiment described herein.

FIG. 7A is a conceptual diagram of a representation of a media content item with a cached portion and a streamed portion, according to an embodiment described herein. The media content item 702 described with respect to FIG. 7A may be the same or similar to the media content items 142 described with respect to FIG. 1. As such, the media content item 702 may be any content item, which may include text data, audio data, image data, video data, metadata, and/or any other data capable of being utilized to output media content to a user.

In the example of FIG. 7A, the media content item 702 may have been selected for precaching utilizing the prediction analytics described in more detail with respect to FIG. 1, above. Additionally, a prediction component, such as the prediction component 140 described with respect to FIG. 6, may be utilized to determine a cached portion 704 of the media content item 702 and a streamed portion 706 of the media content item 702. In the example of FIG. 7A, the cached portion 704 may represent approximately ⅓ of the overall media content item 702 while the streamed portion 706 may represent approximately ⅔ of the overall media content item 702. In this example, the prediction component may have determined, utilizing some or all of the data types described with respect to FIG. 6, that ⅓ of the media content item is the optimal amount to represent the cached portion 704. When this occurs, the media content platform described herein may send the cached portion 704 of the media content item 702 to the client device, which may receive the cached portion and cache that portion of the media content item 702 in memory of the client device. When a representation of the media content item 702 is selected on the client device, a content application as described herein may query the memory of the client device for the cached portion 704 and may utilize the cached portion 704 to initiate output of the media content item 702. While the cached portion 704 is being output, the streamed portion 706 may be requested from the media content platform. The media content platform may return the streamed portion 706 to the client device, which may output the streamed portion 706 after output of the cached portion 704, or sooner if conditions associated with streaming the media content item permit. In examples, an overlap between the cached portion 704 and the streamed portion 706 may exist such that an interruption in output of the media content item 702 does not occur and/or is minimized when the content application transitions from causing output of the cached portion 704 to causing output of the streamed portion 706.

Figure 7B:
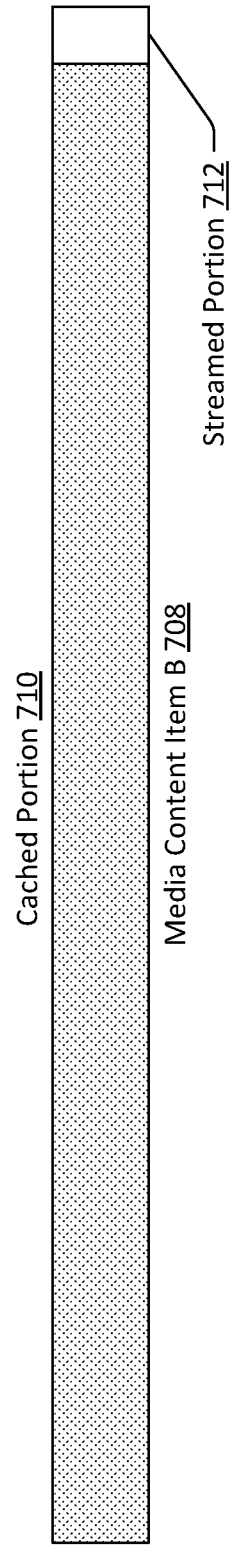
FIG. 7B is a conceptual diagram of another representation of another media content item with a different cached portion and a different streamed portion, according to an embodiment described herein.

FIG. 7B is a conceptual diagram of another representation of another media content item with a different cached portion and a different streamed portion, according to an embodiment described herein. The media content item 708 described with respect to FIG. 7B may be the same or similar to the media content items 142 described with respect to FIG. 1. As such, the media content item 708 may be any content item, which may include text data, audio data, image data, video data, metadata, and/or any other data capable of being utilized to output media content to a user.

In the example of FIG. 7B, the media content item 708 may have been selected for precaching utilizing the prediction analytics described in more detail with respect to FIG. 1, above. Additionally, a prediction component, such as the prediction component 140 described with respect to FIG. 6, may be utilized to determine a cached portion 710 of the media content item 708 and a streamed portion 712 of the media content item 708. In the example of FIG. 7B, the cached portion 710 may represent approximately 95% of the overall media content item 708 while the streamed portion 712 may represent approximately 5% of the overall media content item 708. In this example, the prediction component may have determined, utilizing some or all of the data types described with respect to FIG. 6, that 95% of the media content item is the optimal amount to represent the cached portion 710. When this occurs, the media content platform described herein may send the cached portion 710 of the media content item 708 to the client device, which may receive the cached portion and cache that portion of the media content item 708 in memory of the client device. When a representation of the media content item 708 is selected on the client device, a content application as described herein may query the memory of the client device for the cached portion 710 and may utilize the cached portion 710 to initiate output of the media content item 708. While the cached portion 710 is being output, the streamed portion 712 may be requested from the media content platform. The media content platform may return the streamed portion 712 to the client device, which may output the streamed portion 712 after output of the cached portion 710, or sooner if conditions associated with streaming the media content item permit. In examples, an overlap between the cached portion 710 and the streamed portion 712 may exist such that an interruption in output of the media content item 708 does not occur and/or is minimized when the content application transitions from causing output of the cached portion 710 to causing output of the streamed portion 712.

In the example of FIG. 7B, nearly all of the media content item 708 was determined to be cached by the prediction component. This may occur when connectivity issues are detected and/or predicted for the client device, when prior caching data indicates that the media content item 708 is regularly output by the client device, when location data indicates a likelihood that the media content item 708 will be output, when device data indicates that device capabilities and/or functionality is more favorable for caching than for streaming, when the application version of the content application indicates communications may be delayed with the media content platform, when the content type is multimedia content, when selection likelihood data indicates a high likelihood that the media content item will be selected, when artificial intelligence results indicate desirability for caching a high percentage of the media content item 708, and/or the like.

Figure 7C:
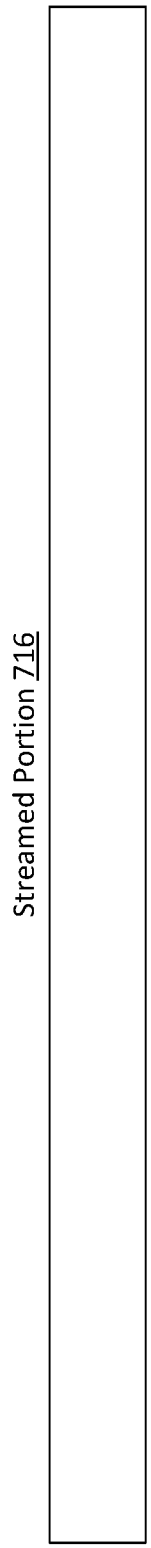
FIG. 7C is a conceptual diagram of another representation of another media content item with a streamed portion and omitting a cached portion.

FIG. 7C is a conceptual diagram of another representation of another media content item with a streamed portion and omitting a cached portion. The media content item 714 described with respect to FIG. 7C may be the same or similar to the media content items 142 described with respect to FIG. 1. As such, the media content item 714 may be any content item, which may include text data, audio data, image data, video data, metadata, and/or any other data capable of being utilized to output media content to a user.

In the example of FIG. 7C, the media content item 714 may not have been selected for precaching utilizing the prediction analytics described in more detail with respect to FIG. 1, above. As such, unlike the media content item 702 with respect to FIG. 7A and media content item 708 with respect to FIG. 7B, the media content item 714, having not been selected for precaching, may not include a cached portion and may instead include a streamed portion 716, which may make up an entirety of the media content item 714. In this example, some or all of the data described with respect to FIG. 5 may have been utilized by the prediction component and may indicate that precaching is not desirable and/or that the media content item 714 was unlikely to be selected for output on the client device. In this example, when the media content item 714 is selected, the streamed portion 716 may be requested from the media content platform. The media content platform may return the streamed portion 716 to the client device, which may output the streamed portion 716.

Figure 7D:
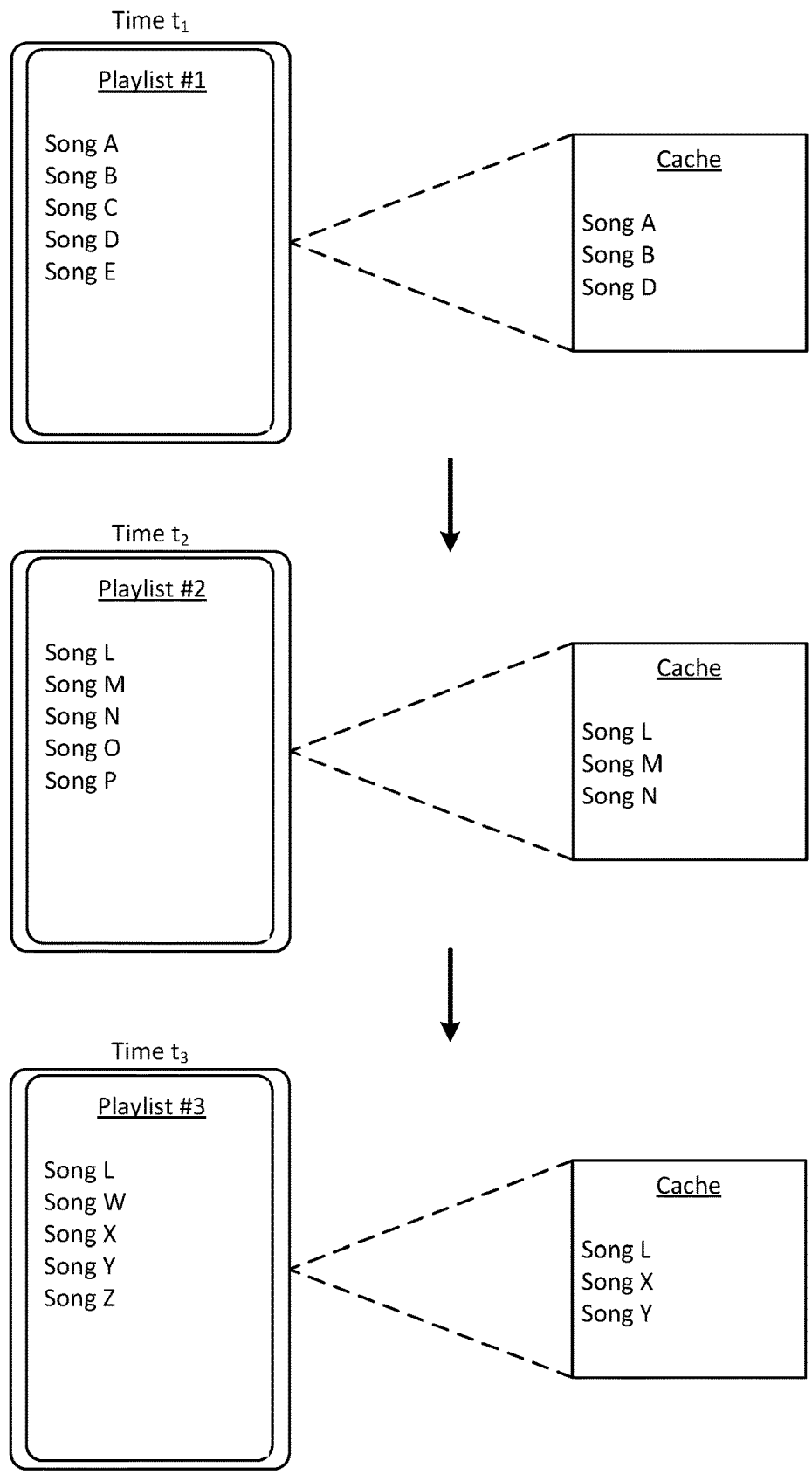
FIG. 7D is a conceptual diagram of example devices and caches associated with predictive media caching, according to an embodiment described herein.

FIG. 7D is a conceptual diagram of example devices and caches associated with predictive media caching, according to an embodiment described herein. The devices described with respect to FIG. 7D may be the same or similar to client device 102 described with respect to FIG. 1. Additionally, the caches may be similar to the caches described above with respect to FIG. 1.

As shown in FIG. 7D, at time $t_1$, the client device 102 may display a first playlist (denoted as Playlist #1). Display of Playlist #1 may be based at least in part on user input data indicating selection of Playlist #1 and/or a media content platform (such as the media content platform 104 described with respect to FIG. 1) causing a user interface that includes details about Playlist #1 to be displayed on the client device 102 at time $t_1$. Playlist #1 may include any number or type of media content items, but in the nonlimiting example of FIG. 7D, Playlist #1 may include Song A, Song B, Song C, Song D, and Song E. As such, at time $t_1$, a prediction component (such as the prediction component 140 described with respect to FIG. 1) may determine that at least a portion of the total media content items to analyze for predictive caching includes Song A, Song B, Song C, Song D, and Song E.

The prediction component may then determine which of the media content items associated with Playlist #1 are to be at least partially cached in memory of the client device 102 as described in more detail above, such as with respect to FIG. 5. In the example of FIG. 7D, the prediction component may determine that Song A, Song B, and Song D have a higher likelihood of being selected than Song C and Song E (or otherwise that a likelihood of selection for Song A, Song B, and Song D satisfies a threshold likelihood for precaching). As such, at least a portion of Song A, at least a portion of Song B, and at least a portion of Song D may be caused to be cached at the client device 102.

Thereafter, such as at time $t_2$, the user interface displayed on the client device 102 may change in one or more respects. As shown by way of nonlimiting example in FIG. 7D, the user interface may change from displaying Playlist #1 to displaying Playlist #2. Playlist #2 may include, in examples, different media content items than the media content items associated with Playlist #1. For example, Playlist #2 is depicted as including Song L, Song M, Song N, Song O, and Song P. As such, at time $t_2$, the prediction component may determine that at least a portion of the total media content items to analyze for predictive caching includes Song L, Song M, Song N, Song O, and Song P.

The prediction component may then determine which of the media content items associated with Playlist #2 are to be at least partially cached in memory of the client device 102 as described in more detail above, such as with respect to FIG. 5. In the example of FIG. 7D, the prediction component may determine that Song L, Song M, and Song N have a higher likelihood of being selected than Song O and Song P (or otherwise that a likelihood of selection for Song L, Song M, and Song N satisfies a threshold likelihood for precaching). As such, at least a portion of Song L, at least a portion of Song M, and at least a portion of Song N may be caused to be cached at the client device 102. In examples, the cached portions of Song A, Song B, and Song D as cached with respect to time $t_1$ may be removed from the cache and replaced with the cached portions of Song L, Song M, and Song N. In other examples, at least a portion of the cached portions of Song A, Song B, and/or Song D may be maintained in the cache.

Then, at time $t_3$, the user interface displayed on the client device 102 may change in one or more respects. As shown by way of nonlimiting example in FIG. 7D, the user interface may change from displaying Playlist #2 to displaying Playlist #3. Playlist #3 may include, in examples, different media content items than the media content items associated with at least a portion of Playlist #2. For example, Playlist #3 is depicted as including Song L, Song W, Song X, Song Y, and Song Z. Note that in this example, a portion of the media content items associated with Playlist #2 may also be associated with Playlist #3 (namely, Song L). As such, at time $t_3$, the prediction component may determine that at least a portion of the total media content items to analyze for predictive caching includes Song L, Song W, Song X, Song Y, and Song Z.

The prediction component may then determine which of the media content items associated with Playlist #3 are to be at least partially cached in memory of the client device 102 as described in more detail above, such as with respect to FIG. 5. In the example of FIG. 7D, the prediction component may determine that Song L, Song X, and Song Y have a higher likelihood of being selected than Song W and Song Z (or otherwise that a likelihood of selection for Song L, Song X, and Song Y satisfies a threshold likelihood for precaching). As such, at least a portion of Song L, at least a portion of Song X, and at least a portion of Song Y may be caused to be cached at the client device 102. In this example, the cached portion of Song L may remain in the cache based at least in part on at least one of (1) the prediction component determining that the likelihood of selection of Song L is still sufficient to cache Song L, (2) Song L being associated with Playlist #2 and Playlist #3, (3) a representation of Song L being maintained on the user interface as between time $t_2$ and time $t_3$, and/or (4) any other determination made by the prediction component. Again, Song M and Song N may be removed from the cache on the client device 102.

Figure 8:
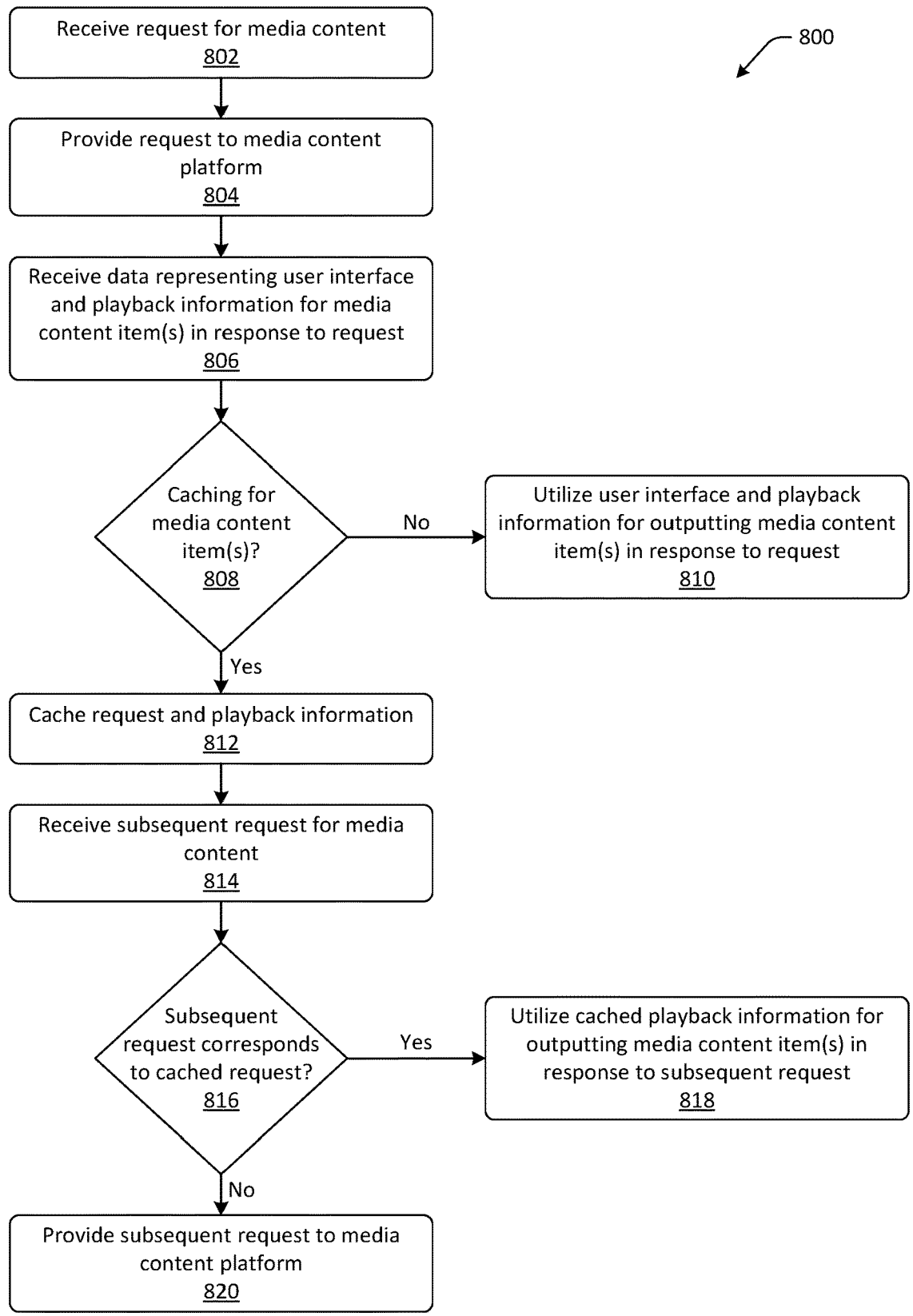
FIG. 8 is a flow diagram of an example process for caching playback information in association with requests for media content items such that the cached playback information may be utilized without making a subsequent request to a media content platform, according to an embodiment described herein.
Figure 9:
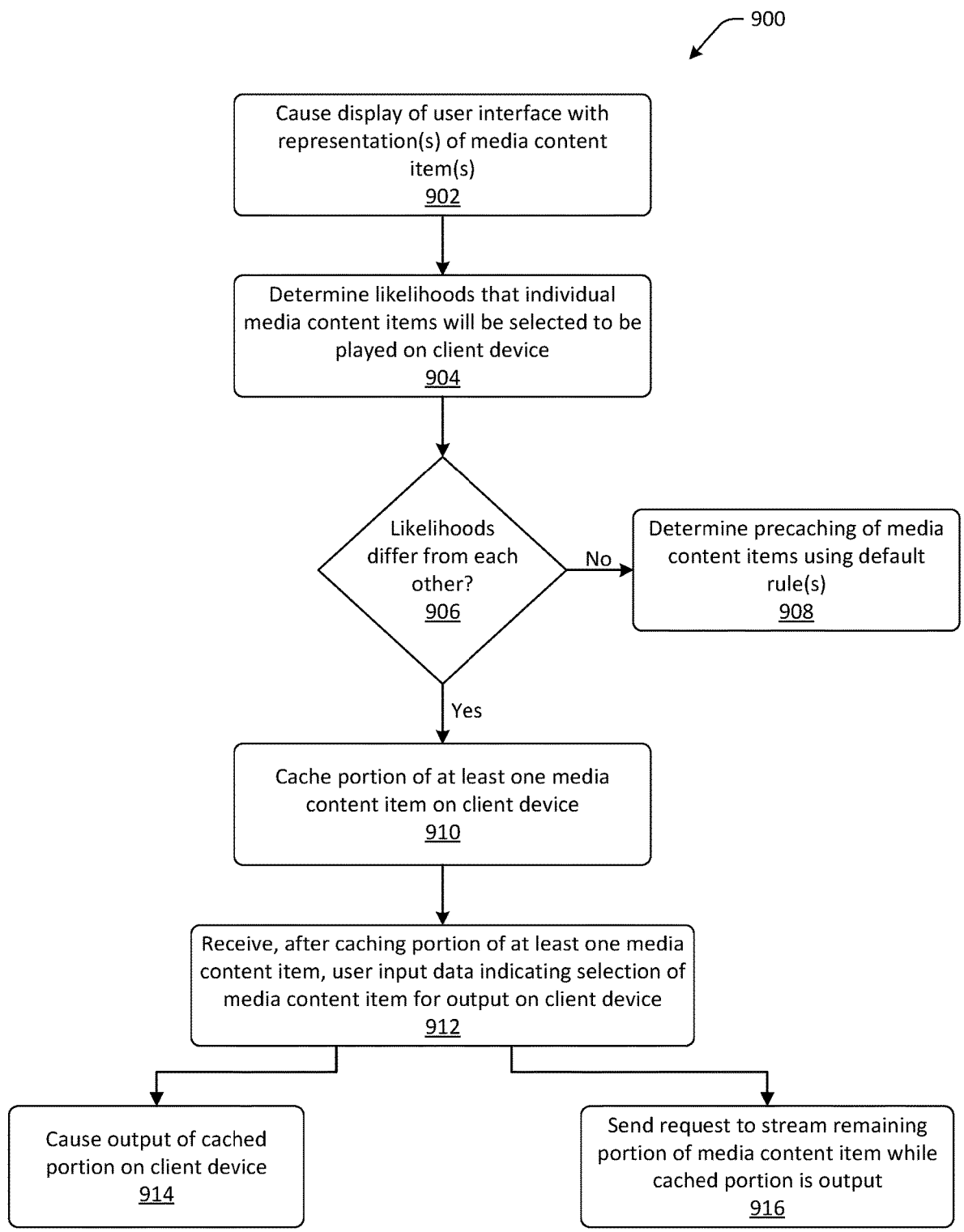
FIG. 9 is a flow diagram of an example process for predictive media caching, according to an embodiment described herein.

FIGS. 8 and 9 include example processes for predictive content caching, according to an embodiment described herein. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7D and 10-14, although the processes may be implemented in a wide variety of other environments, architectures and systems.

FIG. 8 is a flow diagram of an example process 800 for caching playback information in association with requests for media content items such that the cached playback information may be utilized without making a subsequent request to a media content platform, according to an embodiment described herein. In examples, the operations described with respect to FIG. 8 may be performed by a media content platform, such as the media content platform 104 described with respect to FIG. 1, and/or by a client device, such as the client device 102 described with respect to FIG. 1. The order in which the operations or steps are described is not intended to be construed as a limitation, and any number of the described operations may be combined in any order and/or in parallel to implement process 800.

At block 802, the process 800 may include receiving a request for media content. For example, a user may utilize a content application as described herein to access a user interface for selecting media content item(s) to be output on a client device. In other examples, the content application may be utilized to perform media content item searching functionality where user input data is received in the form of a search query and that search query is utilized to identify relevant media content item(s) to present to a user for potential selection. In these and other examples, input data may be received indicating a media content item to be output by the client device being utilized.

At block 804, the process 800 may include providing the request to a media content platform. For example, the content application and/or one or more other components of the client device may send a request for the media content item(s) to the media content platform as described herein, and the media content platform may receive the request. In this example, the media content platform may be configured to receive the request and to determine what media content item(s) are associated with the request and thus which media content item(s) are to be provided to the client device.

At block 806, the process 800 may include receiving data representing a user interface and playback information for media content item(s) in response to the request. For example, the media content platform may send data in addition to the media content item(s) themselves to facilitate both the output of the media content item(s) as well as display and/or other output of information indicating how the media content item(s) are being output. As such, the user interface sent by the media content platform may include information about the media content item(s), playback length of the media content item(s), content associated with the media content item(s) (e.g., album cover art, lyrics data, links to external content, etc.). At least a portion of this data may correspond to the playback information and may be configured to be displayed via the user interface.

At block 808, the process 800 may include determining whether caching for the media content item(s) has been determined. For example, a prediction component as described in more detail above, may be configured to determine likelihoods that certain media content item(s) should be cached in memory of the client device prior to when the media content item(s) are selected for output on the client device. Determining the likelihoods of media content item selection may be performed utilizing data types and/or artificial intelligence modeling as described in more detail with respect to FIGS. 1 and 5.

In examples where the media content item(s) are not to be partially cached, the process 800 may include, at block 810, utilizing the user interface and the playback information for outputting the media content item(s) in response to the request without, in examples, caching the playback information. In this example, the user interface and/or playback information may be utilized to output the requested media content item(s) or otherwise in response to the request that was provided by the user to output the media content item(s). In this situation where the media content item(s) are not to be partially cached, the client device may refrain from caching the playback information in association with the request for subsequent use.

In examples where the media content item(s) are to be partially cached, the process 800 may include, at block 812, caching the request (and/or an identifier of the request) and the playback information. In this example, given the likelihood that the media content item(s) will be selected, in addition to caching at least a portion of the media content item(s) themselves, the client device may cache the playback information and/or the request as well. By so doing, the client device may cache information to allow for not just the media content item(s) to be output, but also for the appropriate user interfaces to be displayed and the relevant playback information to be utilized to output the media content item(s) and to display information via the user interface, all without first requesting such information from the media content platform when a subsequent request for the media content item(s) is received.

At block 814, the process 800 may include receiving a subsequent request for the media content. For example, at some time after the media content item(s) are output in response to the request for such content, the content application may be utilized to request the same media content item(s) at a later time. When such user input data is received, the subsequent request for the media content may be received.

At block 816, the process 800 may include determining whether the subsequent request corresponds to at least one cached request. For example, an identifier of the media content item(s) may be referenced to media content item(s) that have been cached in memory of the client device. When the identifier of the media content item(s) in the subsequent request corresponds to at least one identifier of cached media content item(s), the content application may determine that the subsequent request corresponds to at least one cached request.

In examples where the subsequent request corresponds to at least one cached request, the process 800 may include, at block 818, utilizing the cached playback information for outputting the media content item(s) in response to the subsequent request. In this example, since the playback information was previously cached and therefore may be available to the content application without requesting the same from the media content platform, the content application may determine to utilize the cached playback information to initiate output of the media content item(s) and/or to display information associated with the media content item(s) via the user interface of the content application.

In examples where the subsequent request does not correspond to at least one of the cached requests, the process 800 may include, at block 820, providing the subsequent request to the media content platform. In this example, given that the playback information has not been cached and thus is not available to the client device without requesting the same from the media content platform, the client device may send the subsequent request to the media content platform and request the playback information and/or the user interfaces described herein from the media content platform.

FIG. 9 is a flow diagram of an example process 900 for predictive media caching, according to an embodiment described herein. In examples, the operations described with respect to FIG. 9 may be performed by a media content platform, such as the media content platform 104 described with respect to FIG. 1, and/or by a client device, such as the client device 102 described with respect to FIG. 1. The order in which the operations or steps are described is not intended to be construed as a limitation, and any number of the described operations may be combined in any order and/or in parallel to implement process 900.

At block 902, the process 900 may include causing display of a user interface with representation(s) of media content item(s). For example, the user interface may be the same or similar to the user interface described with respect to FIG. 4. Some or each of the media content item(s) displayed via the user interface may be associated with a representation of such media content item(s). The representations may include identifying information about the media content item(s) and the representation(s) may be selectable.

At block 904, the process 900 may include determining likelihoods that individual media content items will be selected to be played on a client device. In examples, the likelihoods may be based at least in part on at least one of popularity of a given media content item relative to other media content items on the media content platform, a recency that the media content item was played by the client device, a time at which the media content item was released by the media content platform, portion of the media that was accessed on another platform, e.g., a streaming platform, a social network platform, and the like, or an association of the media content item with a further media content item that was previously played or is currently being played by the client device. Additional data that may be utilized to determine likelihoods that media content items will be selected is described in more detail below.

Other input types may include, for example, indicators of activities that a user is involved in when the request for the media content item is provided. For example, scheduling data and/or user input indicating user activities may be utilized to determine what activity the user is involved in or is likely to be involved in when the request for media content items is received or when the user interface is displayed on the client device. By way of example, a user may be engaged in the activity of exercising, and this activity may be more associated with given playlists, music genres, etc. In another example, the user may be engaged in a work-related activity, and this activity may be more associated with other playlists, music genres, etc.

Likewise, the device type of the client device may evidence which media content items are more likely to be selected over other media content items. For example, if the client device is a desktop computer or laptop computer issued in relation to a work profile, such a device type may evidence that the device is utilized for work more frequently than for other purposes, and such use may be more associated with given playlists, music genres, etc. In other examples, the client device may be a mobile device, a wearable device, or a device associated with a given purpose such as tracking health statistics, workout routines, etc. In this example, such a device type may be associated with other media content items. In some examples, the device types may be mapped to historical media content item usage to determine, for a given user or group of users, what media content items or categories of media content items have a higher likelihood to be utilized by a client device of a given device type.

In still other examples, other applications being utilized by the client device when the user interface is enabled or when a content application associated with the media content platform is enabled may inform the likelihood of given media content items being selected. For example, applications associated with work functions, Internet browsing, social media, etc. may be associated with historical selection of given media content items or categories of media content items. As such, when certain applications are enabled on the client device, those applications may impact the likelihood that a given media content item will be selected.

In examples, an artificial intelligence model may be generated and configured to determine the likelihoods of media content item selection. Additionally, one or more training datasets may be generated to train the artificial intelligence model to predict selection of media content items. The training datasets may include any or all of the data described herein, including feedback data indicating whether previously-predicted media content items were in fact selected by a user of the client device or other users of other client devices. Thereafter, a trained artificial intelligence model may be generated utilizing the training dataset and the trained artificial intelligence model may be used to predict whether given media content items will be selected. By so doing, the computer-centric problem of training artificial intelligence models to perform operations that were not available prior to training and that provide a superior result to what a human could hope to achieve is solved by the computer-centric solutions described herein.

At block 906, the process 900 may include determining whether the likelihoods differ from each other. When the likelihoods of media content item selection have been determined, the media content items may be ranked based at least in part on the likelihoods, with the higher-likelihood media content item being ranked more favorably than other media content items with lower likelihoods of selection. Thereafter, a given number of media content items may be selected for caching utilizing the ranking. In some examples, the higher-likelihood media content item may be cached. In other examples, a given number of the highest ranked media content items may be cached. The artificial intelligence models described herein may be utilized to determine, for a given client device, how many media content items are to be selected for caching as described herein. In still other examples, the systems described herein may determine that there is a difference between a likelihood that a given media content item will be selected and an additional likelihood that another media content item will be selected. Based at least in part on this difference, one of the two media content items may be precached as described herein.

In examples where the likelihoods do not differ from each other, the process 900 may include, at block 908, determining precaching of media content items based at least in part on default rules. In this example, given that media content item caching may still be beneficial, one or more default rules may be applied to determine which media content items to at least partially cache. Those default rules may include a given number of media content items on a playlist, a given number of most frequently selected media content items, media content items associated with user preferences, recommended media content items, and the like.

In examples where the likelihoods differ from each other, the process 900 may include, at block 910, caching a portion of at least one media content item on the client device. For example, the client device may cache a portion of the media content item(s) that were predicted to be selected in memory of the client device without caching the media content item(s) that were predicted to be less likely to be selected. This process may include querying the media content platform for the portion of the media content item(s), receiving data representing the portion of the media content item(s), and caching the portions of the media content item(s) in memory of the client device.

At block 912, the process 900 may include receiving, after caching the portion of the at least one media content item, user input data indicating selection of the media content item for output on the client device. User input data indicating selection of the media content item may be received via the user interfaces described above.

At block 914, the process 900 may include causing output of the cached portion of the media content item on the client device. For example, the cached portion of the media content item may be the first 10-20 seconds of the item and the cached portion may be utilized to start outputting the media content item on the client device.

At block 916, which may be performed at least partially in parallel with the operations described with respect to block 914, the process 900 may include sending a request to stream a remaining portion of the media content item while the cached portion is output. For example, while the cached portion is being output, the client device may query the media content platform for the remainder of the media content item, and the media content platform may begin to stream data representing the item to the client device. Once the data representing the media content item is received from the media content platform by streaming the content to the client device, the client device may utilize the streamed data to output the remainder of the item.

Figure 10:
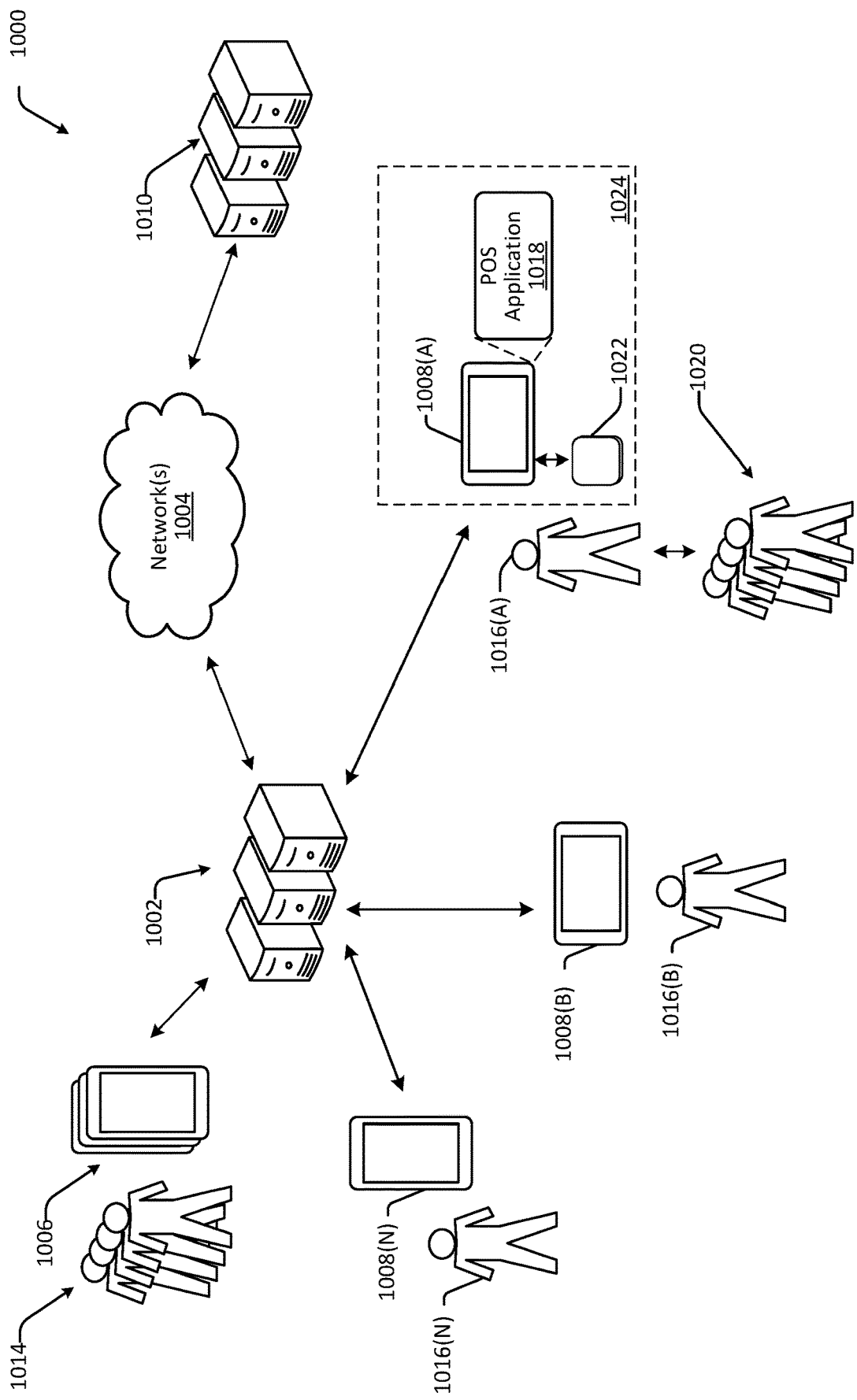
FIG. 10 is an example environment with user devices, merchant devices, a payment service, and/or other systems that may be involved in a transaction, such as by utilizing the payment application as configured herein, according to an embodiment described herein.

FIG. 10 illustrates an example environment 1000. The environment 1000 includes server(s) 1002 that can communicate over a network 1004 with user devices 1006 (which, in some examples can be merchant devices 1008 (individually, 1008(A)-1008(N))) and/or server(s) 1010 associated with third-party service provider(s). The server(s) 1002 can be associated with a service provider that can provide one or more services for the benefit of users 1014, as described below. Actions attributed to the service provider can be performed by the server(s) 1002.

In examples, the components of the media content platform 104 described with respect to FIG. 1 may be components of the server(s) 1002. Additionally, the POS application 1018 may be associated with the content application 122 described with respect to FIG. 1. Furthermore, the components of the client device 102 described with respect to FIG. 1 may be components of the user devices 1006 and/or 1008.

The environment 1000 can include a plurality of user devices 1006, as described above. Each one of the plurality of user devices 1006 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1014. The users 1014 can be referred to as customers, buyers, merchants, sellers, borrowers, employees, employers, payors, payees, couriers, artists, musicians, listeners, supervisors, hosts, audience members, and so on. The users 1014 can interact with the user devices 1006 via user interfaces presented via the user devices 1006. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1006 can have an instance or versioned instance of an application, which can be downloaded from an application store, for example, which can present the user interface(s) described herein. In at least one example, a user 1014 can interact with the user interface via touch input, spoken input, or any other type of input.

As described above, in at least one example, the users 1014 can include merchants 1016 (individually, 1016(A)-1016(N)). In an example, the merchants 1016 can operate respective merchant devices 1008, which can be user devices 1006 configured for use by merchants 1016. For the purpose of this discussion, a "merchant" can be any entity that offers items (e.g., goods or services) for purchase or other means of acquisition (e.g., rent, borrow, barter, etc.). The merchants 1016 can offer items for purchase or other means of acquisition via brick-and-mortar stores, mobile stores (e.g., pop-up shops, food trucks, etc.), online stores, event venues, combinations of the foregoing, and so forth. In some examples, at least some of the merchants 1016 can be associated with a same entity but can have different merchant locations and/or can have franchise/franchisee relationships. In additional or alternative examples, the merchants 1016 can be different merchants. That is, in at least one example, the merchant 1016(A) is a different merchant than the merchant 1016(B) and/or the merchant 1016(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1008 can have an instance of a POS application 1018 stored thereon. The POS application 1018 can configure the merchant device 1008 as a POS terminal, which enables the merchant 1016(A) to interact with one or more customers 1020. As described above, the users 1014 can include customers, such as the customers 1020 shown as interacting with the merchant 1016(A). For the purpose of this discussion, a "customer" can be any entity that acquires items from merchants. While only two customers 1020 are illustrated in FIG. 10, any number of customers 1020 can interact with the merchants 1016. Further, while FIG. 10 illustrates the customers 1020 interacting with the merchant 1016(A), the customers 1020 can interact with any of the merchants 1016.

In at least one example, interactions between the customers 1020 and the merchants 1016 that involve the exchange of funds (from the customers 1020) for items (from the merchants 1016) can be referred to as "transactions." In at least one example, the POS application 1018 can determine transaction data associated with the POS transactions. Transaction data can include payment information, which can be obtained from a reader device 1022 associated with the merchant device 1008(A), user authentication data, purchase amount information, point-of-purchase information (e.g., item(s) purchased, date of purchase, time of purchase, subscription type, etc.), etc. The POS application 1018 can send transaction data to the server(s) 1002 such that the server(s) 1002 can track transactions of the customers 1020, merchants 1016, and/or any of the users 1014 over time. Furthermore, the POS application 1018 can present a UI to enable the merchant 1016(A) to interact with the POS application 1018 and/or the service provider via the POS application 1018.

In at least one example, the merchant device 1008(A) can be a special-purpose computing device configured as a POS terminal (via the execution of the POS application 1018). In at least one example, the POS terminal may be connected to a reader device 1022, which is capable of accepting a variety of payment instruments, such as credit cards, debit cards, gift cards, short-range communication based payment instruments, and the like, as described below. In at least one example, the reader device 1022 can plug in to a port in the merchant device 1008(A), such as a microphone port, a headphone port, an audio-jack, a data port, or other suitable port. In additional or alternative examples, the reader device 1022 can be coupled to the merchant device 1008(A) via another wired or wireless connection, such as via a Bluetooth®, BLE, and so on. Additional details are described below with reference to FIG. 7. In some examples, the reader device 1022 can read information from alternative payment instruments including, but not limited to, wristbands and the like.

In some examples, the reader device 1022 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1022, and communicate with the server(s) 1002, which can provide, among other services, a payment processing service. The server(s) 1002 associated with the service provider can communicate with server(s) 1010, as described below. In this manner, the POS terminal and reader device 1022 may collectively process transaction(s) between the merchants 1016 and customers 1020. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, speakers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1022 of the POS system 1024 are shown as separate devices, in additional or alternative examples, the POS terminal and the reader device 1022 can be part of a single device. In some examples, the reader device 1022 can have a display integrated therein for presenting information to the customers 1020. In additional or alternative examples, the POS terminal can have a display integrated therein for presenting information to the customers 1020. POS systems, such as the POS system 1024, may be mobile, such that POS terminals and reader devices may process transactions in disparate locations across the world. POS systems can be used for processing card-present transactions and card-not-present (CNP) transactions, as described below.

A card-present transaction is a transaction where both a customer 1020 and his or her payment instrument are physically present at the time of the transaction. Card-present transactions may be processed by swipes, dips, taps, or any other interaction between a physical payment instrument (e.g., a card), or otherwise present payment instrument, and a reader device 1022 whereby the reader device 1022 is able to obtain payment data from the payment instrument. A swipe is a card-present transaction where a customer 1020 slides a card, or other payment instrument, having a magnetic strip through a reader device 1022 that captures payment data contained in the magnetic strip. A dip is a card-present transaction where a customer 1020 inserts a payment instrument having an embedded microchip (i.e., chip) into a reader device 1022 first. The dipped payment instrument remains in the payment reader until the reader device 1022 prompts the customer 1020 to remove the card, or other payment instrument. While the payment instrument is in the reader device 1022, the microchip can create a one-time code which is sent from the POS system 1024 to the server(s) 1010 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1020 may tap or hover his or her payment instrument (e.g., card, electronic device such as a smart phone running a payment application, etc.) over a reader device 1022 to complete a transaction via short-range communication (e.g., NFC, RFID, Bluetooth®, BLE, etc.). Short-range communication enables the payment instrument to exchange information with the reader device 1022. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1024, the server(s) 1002, and/or the server(s) 1010 may exchange payment information and transaction data to determine whether transactions are authorized. For example, the POS system 1024 may provide encrypted payment data, user authentication data, purchase amount information, point-of-purchase information, etc. (collectively, transaction data) to server(s) 1002 over the network(s) 1004. The server(s) 1002 may send the transaction data to the server(s) 1010. As described above, in at least one example, the server(s) 1010 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1010 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 1010 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1010 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1010 associated therewith), and a payment authorization message is communicated from the issuer to the POS device via a path opposite of that described above, or via an alternate path.

As described above, the server(s) 1010, which can be associated with payment service provider(s), may determine whether the transaction is authorized based on the transaction data, as well as information relating to parties to the transaction (e.g., the customer 1020 and/or the merchant 1016(A)). The server(s) 1010 may send an authorization notification over the network(s) 1004 to the server(s) 1002, which may send the authorization notification to the POS system 1024 over the network(s) 1004 to indicate whether the transaction is authorized. The server(s) 1002 may also transmit additional information such as transaction identifiers to the POS system 1024. In one example, the server(s) 1002 may include a merchant application and/or other functional components for communicating with the POS system 1024 and/or the server(s) 1010 to authorize or decline transactions.

Based on the authentication notification that is received by the POS system 1024 from server(s) 1002, the merchant 1016(A) may indicate to the customer 1020 whether the transaction has been approved. In some examples, approval may be indicated at the POS system 1024, for example, at a display of the POS system 1024. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, media content (e.g., music, videos, etc.) management and/or subscription services, and so on. In some examples, the users 1014 can access all of the services of the service provider. In other examples, the users 1014 can have gradated access to the services, which can be based on risk tolerance, IDV outputs, subscriptions, and so on. In at least one example, access to such services can be availed to the merchants 1016 via the POS application 1018. In additional or alternative examples, each service can be associated with its own access point (e.g., application, web browser, etc.).

The service provider can offer payment processing services for processing payments on behalf of the merchants 1016, as described above. For example, the service provider can provision payment processing software, payment processing hardware and/or payment processing services to merchants 1016, as described above, to enable the merchants 1016 to receive payments from the customers 1020 when conducting POS transactions with the customers 1020. For instance, the service provider can enable the merchants 1016 to receive cash payments, payment card payments, and/or electronic payments from customers 1020 for POS transactions and the service provider can process transactions on behalf of the merchants 1016.

As the service provider processes transactions on behalf of the merchants 1016, the service provider can maintain accounts or balances for the merchants 1016 in one or more ledgers. For example, the service provider can analyze transaction data received for a transaction to determine an amount of funds owed to a merchant 1016(A) for the transaction. In at least one example, such an amount can be a total purchase price less fees charged by the service provider for providing the payment processing services. Based on determining the amount of funds owed to the merchant 1016(A), the service provider can deposit funds into an account of the merchant 1016(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1016(A) to a bank account of the merchant 1016(A) that is held at a bank or other financial institution (e.g., associated with the server(s) 1010). Scheduled deposits can occur at a prearranged time after a POS transaction is funded, which can be a business day after the POS transaction occurred, or sooner or later. In some examples, the merchant 1016(A) can access funds prior to a scheduled deposit. For instance, the merchant 1016(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1016(A) can have a payment instrument that is linked to the stored balance that enables the merchant to access the funds without first transferring the funds from the account managed by the service provider to the bank account of the merchant 1016(A).

In at least one example, the service provider may provide inventory management services. That is, the service provider may provide inventory tracking and reporting. Inventory management services may enable the merchant 1016(A) to access and manage a database storing data associated with a quantity of each item that the merchant 1016(A) has available (i.e., an inventory). Furthermore, in at least one example, the service provider can provide catalog management services to enable the merchant 1016(A) to maintain a catalog, which can be a database storing data associated with items that the merchant 1016(A) has available for acquisition (i.e., catalog management services). In at least one example, the catalog may include a plurality of data items and a data item of the plurality of data items may represent an item that the merchant 1016(A) has available for acquisition. The service provider can offer recommendations related to pricing of the items, placement of items on the catalog, and multi-party fulfillment of the inventory.

In at least one example, the service provider can provide business banking services, which allow the merchant 1016(A) to track deposits (from payment processing and/or other sources of funds) into an account of the merchant 1016(A), payroll payments from the account (e.g., payments to employees of the merchant 1016(A)), payments to other merchants (e.g., business-to-business) directly from the account or from a linked debit card, withdrawals made via scheduled deposit and/or instant deposit, etc. Furthermore, the business banking services can enable the merchant 1016(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1016 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, music studio recording time, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1016. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the service provider associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1014 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1016. In at least one example, the service provider can recommend and/or generate content items to supplement omni-channel presences of the merchants 1016. That is, if a merchant of the merchants 1016 has a web page, the service provider—via the web-development or other services—can recommend and/or generate additional content items to be presented via other channel(s), such as social media, email, media content streaming, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 1014 to set schedules for scheduling appointments and/or users 1014 to schedule appointments.

In some examples, the service provider can provide restaurant management services to enable users 1014 to make and/or manage reservations, to monitor front-of-house and/or back-of-house operations, and so on. In such examples, the merchant device(s) 1008 and/or server(s) 1002 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 1014 who can travel between locations to perform services for a requesting user 1014 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1006.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1014, voice inputs into a virtual assistant or the like, to determine intents of user(s) 1014. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1014 may be new to the service provider such that the user 1014 that has not registered (e.g., subscribed to receive access to one or more services offered by the service provider) with the service provider. The service provider can offer onboarding services for registering a potential user 1014 with the service provider. In some examples, onboarding can involve presenting various questions, prompts, and the like to a potential user 1014 to obtain information that can be used to generate a profile for the potential user 1014. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, a user of a music streaming service can listen to music having advertisement breaks prior to being fully onboarded, etc.). In at least one example, responsive to the potential user 1014 providing information requested as part of onboarding, the potential user 1014 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1010). That is, the service provider can offer IDV services to verify the identity of users 1014 seeking to use or using their services. Identity verification requires a customer (or potential customer) to provide information that is used by compliance departments to prove that the information is associated with an identity of a real person or entity (e.g., an artist). In at least one example, the service provider can perform services for determining whether identifying information provided by a user 1014 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 1010 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1002) and/or the server(s) 1010 via the network(s) 1004. In some examples, the merchant device(s) 1008 are not capable of connecting with the service provider (e.g., the server(s) 1002) and/or the server(s) 1010, due to a network connectivity issue, for example. In additional or alternative examples, the server(s) 1002 are not capable of communicating with the server(s) 1010 due to network connectivity issue, for example. In such examples, devices may operate in "offline" mode where at least some payment data is stored (e.g., on the merchant device(s) 1008) and/or the server(s) 1002 until connectivity is restored and the payment data can be transmitted to the server(s) 1002 and/or the server(s) 1010 for processing.

In at least one example, the service provider can be associated with a hub, such as an order hub, an inventory hub, a fulfillment hub and so on, which can enable integration with one or more additional service providers (e.g., associated with the additional server(s) 1010). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1006 that are in communication with server(s) 1002 of the service provider. That is, techniques described herein are directed to a specific implementation—or, a practical application—of utilizing a distributed system of user devices 1006 that are in communication with server(s) 1002 of the service provider to perform a variety of services, as described above. The unconventional configuration of the distributed system described herein enables the server(s) 1002 that are remotely-located from end-users (e.g., users 1014) to intelligently offer services based on aggregated data associated with the end-users, such as the users 1014 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Further, models or algorithms that are used to implement techniques described herein may be retrained over time to improve outcomes for subsequent scenarios based on outcomes of previous scenarios. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1014 and user devices 1006. Furthermore, such features are changed dynamically based on the profiles of the users involved interacting with the GUIs. As such, techniques described herein are directed to improvements to computing systems.

Figure 11:
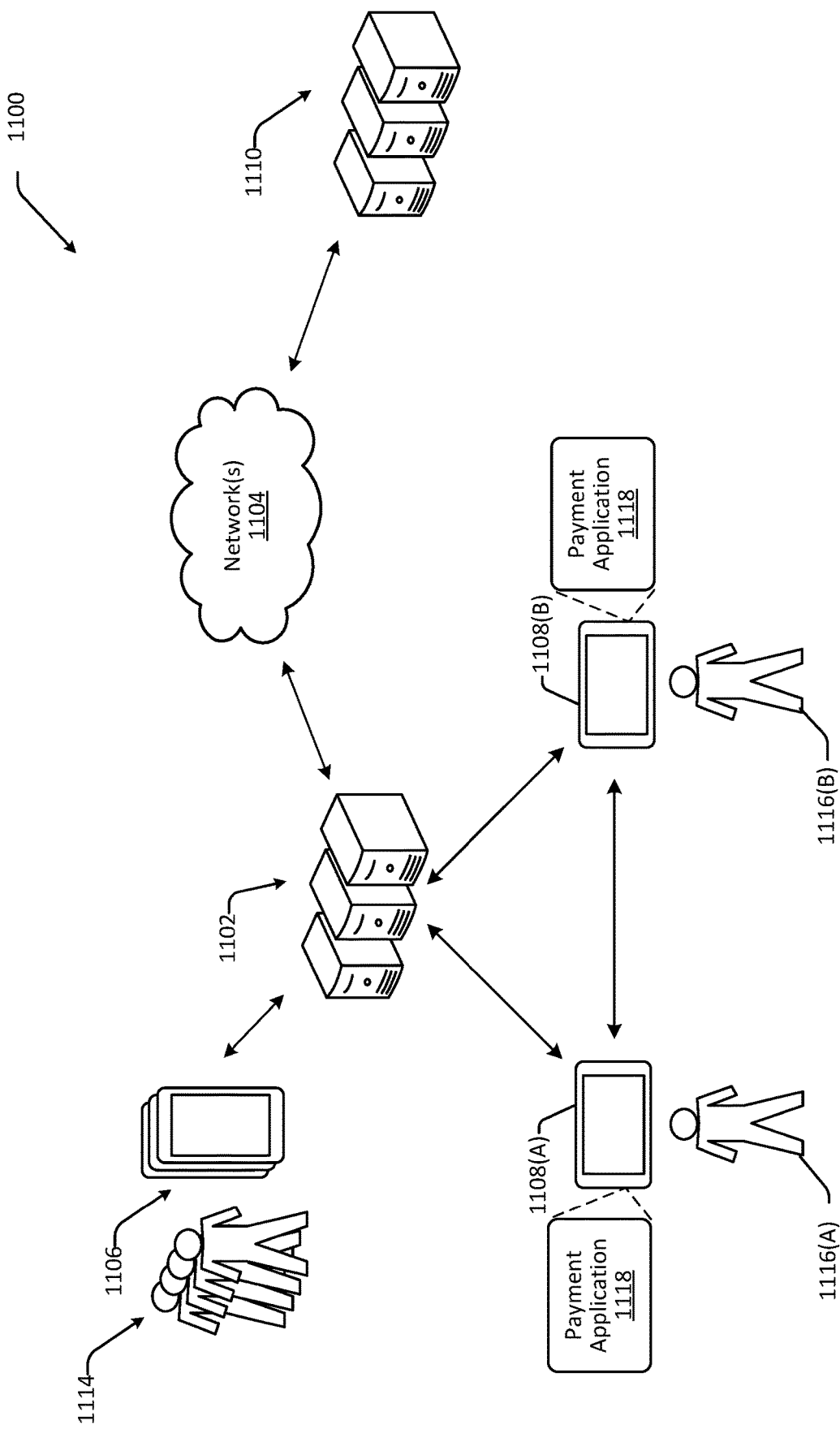
FIG. 11 is an example environment illustrating usage of the payment application, such as described herein, according to an embodiment described herein.

FIG. 11 illustrates an example environment 1100. The environment 1100 includes server(s) 1102 that can communicate over a network 1104 with user devices 1106 (which, in some examples can be user devices 1108 (individually, 1108(A), 1108(B)) and/or server(s) 1110 associated with third-party service provider(s). The server(s) 1102 can be associated with a service provider that can provide one or more services for the benefit of users 1114, as described below. Actions attributed to the service provider can be performed by the server(s) 1102. In some examples, the service provider referenced in FIG. 10 can be the same or different than the service provider referenced in FIG. 11.

In examples, the components of the media content platform 104 described with respect to FIG. 1 may be components of the server(s) 1102. Additionally, the payment application 1118 may be associated with the content application 122 described with respect to FIG. 1. Furthermore, the components of the client device 102 described with respect to FIG. 1 may be components of the user devices 1106 and/or 1108.

The environment 1100 can include a plurality of user devices 1106, as described above. Each one of the plurality of user devices 1106 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1114. The users 1114 can be referred to as customers, buyers, merchants, sellers, borrowers, employees, employers, payors, payees, couriers, artists, musicians, listeners, supervisors, hosts, audience members, and so on. The users 1114 can interact with the user devices 1106 via user interfaces presented via the user devices 1106. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1106 can have an instance or versioned instance of an application, which can be downloaded from an application store, for example, which can present the user interface(s) described herein. In at least one example, a user 1114 can interact with the user interface via touch input, spoken input, or any other type of input.

In at least one example, the service provider can provide a peer-to-peer payment service that enables peer-to-peer payments between two or more users 1114. Two users, user 1116(A) and user 1116(B) are illustrated in FIG. 11 as "peers" in a peer-to-peer payment. In at least one example, the service provider can communicate with instances of a payment application 1118 (or other access point) installed on devices 1106 configured for operation by users 1114. In an example, an instance of the payment application 1118 executing on a first device 1108(A) operated by a payor (e.g., user 1116(A)) can send a request to the service provider to transfer an asset (e.g., fiat currency, non-fiat currency, digital assets such as non-fungible tokens (NFTs), cryptocurrency, securities, gift cards, and/or related assets) from the payor to a payee (e.g., user 1116(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 12:
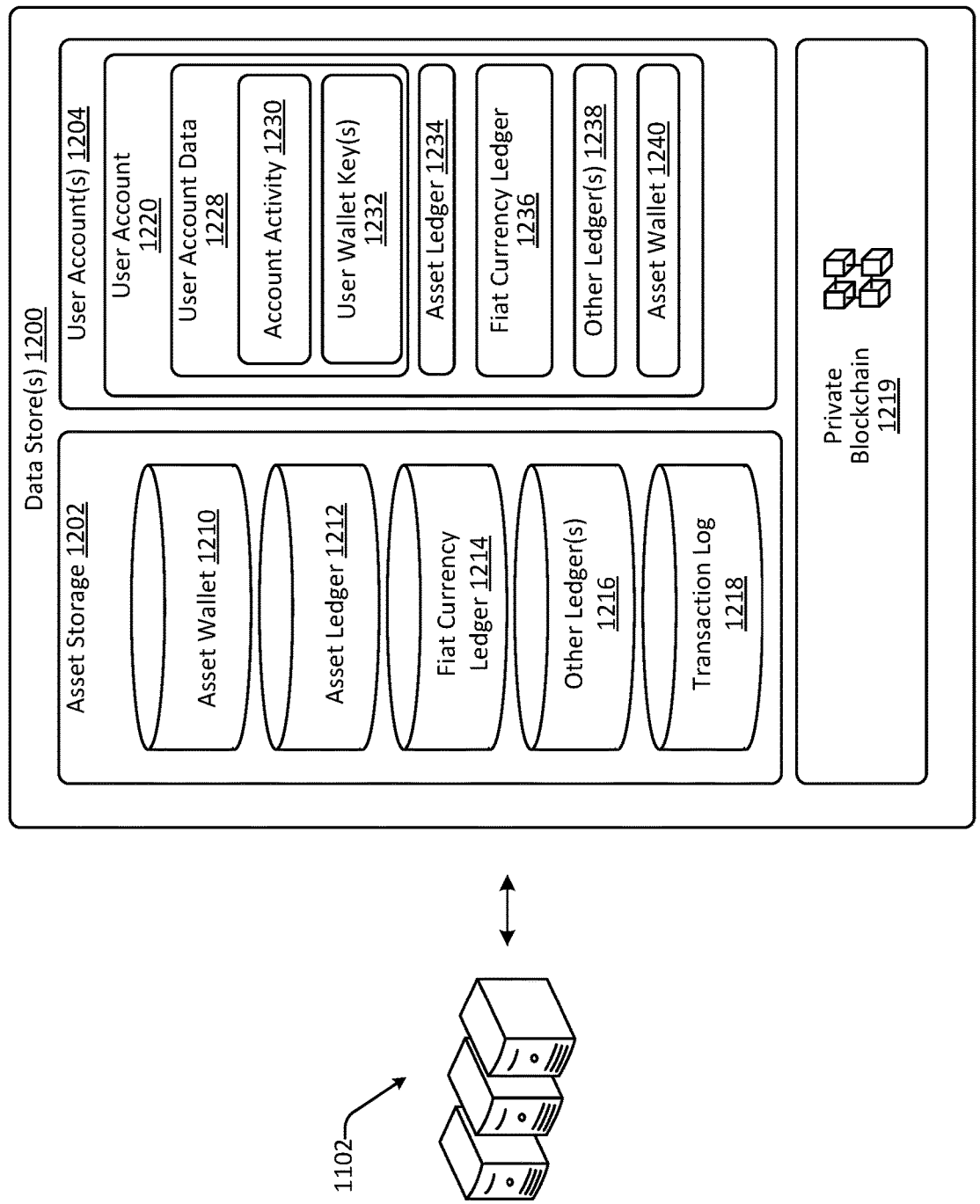
FIG. 12 is an example of datastore(s) that can be associated with servers of the payment service, according to an embodiment described herein.

In some examples, the service provider can utilize a ledger system to track transfers of assets between users 1114. FIG. 12, below, provides additional details associated with such a ledger system. The ledger system can enable users 1114 to own fractional shares of assets that are not conventionally available. For instance, a user can own a fraction of a Bitcoin, an NFT, or a stock. Additional details are described herein.

In at least one example, the service provider can facilitate transfers and can send notifications related thereto to instances of the payment application 1118 executing on user device(s) of payee(s). As an example, the service provider can transfer assets from an account of user 1116(A) to an account of the user 1116(B) and can send a notification to the user device 1108(B) of the user 1116(B) for presentation via a user interface. The notification can indicate that a transfer is in process, a transfer is complete, or the like. In some examples, the service provider can send additional or alternative information to the instances of the payment application 1118 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1102 to treat the inputs as a request from the payor to transfer assets, where detection of the syntax triggers a transfer of assets. The currency indicator can correspond to various currencies including but not limited to, dollar ($), euro (€), pound (E), rupee (Z), yuan (v), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, artist or band names, and/or the like can be used to trigger and/or identify users of a peer-to-peer payment process.

In some examples, the peer-to-peer payment process can be initiated through instances of the payment application 1118 executing on the user devices 1106. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through streaming of content, comments, posts, messages on electronic bulletin boards, messages on a social networking platform, and/or any other types of messages. In some examples, the content provider can be the service provider as described with reference to FIG. 11 or a third-party service provider associated with the server(s) 1110. In examples where the content provider is a third-party service provider, the server(s) 1110 can be accessible via one or more APIs or other integrations. The forum can be employed by a content provider to enable users of the forum to interact with one another (e.g., through creating messages, posting comments, streaming media content, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 11. For instance, the service provider can offer messaging services that provide a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1106 (e.g., mobile device or conventional personal computer (PC)) based on instructions transmitted to and from the server(s) 1102 (which, in such an example can be called a "messaging server"). In some instances, the messaging application can include a payment application with messaging capability that enables users of the payment application to communicate with one another. In such instances, the payment application can be executed on a user device 1106 based on instructions transmitted to and from the server(s) 1102 (e.g., the payment service discussed in this description or another payment service that supports payment transactions). In some examples, the messaging application can be provided by a third-party service provider associated with the server(s) 1110. In examples where the messaging application is a third-party service provider, the server(s) 1110 can be accessible via one or more APIs or other integrations.

As described above, the service provider can facilitate peer-to-peer transactions, which can enable users 1114 to transfer fiat currency, non-fiat currency, cryptocurrency, securities, or other assets, or portions thereof, to other users 1114. In at least one example, individual users can be associated with user accounts. Additional details associated with user accounts and the transfer of assets between users 1114 are described below with reference to FIG. 12.

Furthermore, the service provider of FIG. 11 can enable users 1114 to perform banking transactions via instances of the payment application 1118. For example, users can configure direct deposits or other deposits for adding assets to their various ledgers/balances. Further, users 1114 can configure bill pay, recurring payments, and/or the like using assets associated with their accounts. In addition to sending and/or receiving assets via peer-to-peer transactions, users 1114 buy and/or sell assets via asset networks such as cryptocurrency networks, securities networks, and/or the like.

FIG. 12 illustrates example data store(s) 1200 that can be associated with the server(s) 1102.

In at least one example, the data store(s) 1200 can store assets in an asset storage 1202, as well as data in user account(s) 1204. In some examples, user account(s) 1204 can include merchant account(s) 1206, and/or customer account(s) 1208. In at least one example, the asset storage 1202 can be used to store assets managed by the service provider of FIG. 11. In at least one example, the asset storage 1202 can be used to record whether individual ones of the assets are registered to users. For example, the asset storage 1202 can include an asset wallet 1210 for storing records of assets owned by the service provider of FIG. 11, such as cryptocurrency, securities, NFTs, or the like, and communicating with one or more asset networks, such as cryptocurrency networks, NFT networks, securities networks, or the like. In some examples, the asset network can be a first-party network or a third-party network, such as a cryptocurrency exchange or the stock market. In examples where the asset network is a third-party network, the server(s) 1110 can be associated therewith. In some examples, the asset wallet 1210 can communicate with the asset network via one or more components associated with the server(s) 1102.

The asset wallet 1210 can be associated with one or more addresses and can vary addresses used to acquire assets (e.g., from the asset network(s)) so that its holdings are represented under a variety of addresses on the asset network. In examples where the service provider of FIG. 11 has its own holdings of cryptocurrency (e.g., in the asset wallet 1210), a user can acquire cryptocurrency directly from the service provider of FIG. 11. In some examples, the service provider of FIG. 11 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of an asset network can be separate from a customer-merchant transaction or a peer-to-peer transaction, and therefore not necessarily time-sensitive. This can enable batching transactions to reduce computational resources and/or costs. The service provider can provide the same or similar functionality for securities or other assets.

The asset storage 1202 may contain ledgers that store records of assignments of assets to users 1114. Specifically, the asset storage 1202 may include asset ledger 1234, fiat currency ledger 1214, and other ledger(s) 1216, which can be used to record transfers of assets between users 1114 of the service provider and/or one or more third-parties (e.g., merchant network(s), payment card network(s), ACH network(s), equities network(s), the asset network, securities networks, etc.). In doing so, the asset storage 1202 can maintain a running balance of assets managed by the service provider of FIG. 11. The ledger(s) of the asset storage 1202 can further indicate some of the running balance for each of the ledger(s) stored in the asset storage 1202 is assigned or registered to one or more user account(s) 1204.

In at least one example, the asset storage 1202 can include transaction logs 1218, which can include records of past transactions involving the service provider of FIG. 11. In at least one example, transaction data, as described herein, can be stored in association with the transaction logs 1218.

In some examples, the data store(s) 1200 can store a private blockchain 1219. A private blockchain 1219 can function to record sender addresses, recipient addresses, public keys, values of cryptocurrency transferred, and/or can be used to verify ownership of cryptocurrency tokens to be transferred. In some examples, the service provider of FIG. 11 can record transactions taking place within the service provider of FIG. 11 involving cryptocurrency until the number of transactions has exceeded a determined limit (e.g., number of transactions, storage space allocation, etc.). Based at least in part on determining that the limit has been reached, the service provider of FIG. 11 can publish the transactions in the private blockchain 1219 to a public blockchain (e.g., associated with the asset network), where miners can verify the transactions and record the transactions to blocks on the public blockchain. In at least one example, the service provider of FIG. 11 can participate as miner(s) at least for its transactions to be posted to the public blockchain.

In at least one example, the data store(s) 1200 can store and/or manage accounts, such as user account(s) 1204, merchant account(s) 1206, and/or customer account(s) 1208. In at least one example, the user account(s) 1204 may store records of user accounts associated with the users 1114. In at least one example, the user account(s) 1204 can include a user account 1220, which can be associated with a user (of the users 1114). Other user accounts of the user account(s) 1204 can be similarly structured to the user account 1220, according to some examples. In other examples, other user accounts may include more or less data and/or account information than that provided by the user account 1220. In at least one example, the user account 1220 can include user account data 1228, which can include, but is not limited to, data associated with user identifying information (e.g., name, phone number, address, artist or band name, verified credentials, etc.), user identifier(s) (e.g., alphanumeric identifiers, etc.), user preferences (e.g., learned or user-specified), purchase history data (e.g., identifying one or more items purchased (and respective item information), subscription tier information, etc.), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1228 can include account activity 1230 and user wallet key(s) 1232. The account activity 1230 may include a transaction log for recording transactions associated with the user account 1220. In some examples, the user wallet key(s) 1232 can include a public-private key-pair and a respective address associated with the asset network or other asset networks. In some examples, the user wallet key(s) 1232 may include one or more key pairs, which can be unique to the asset network or other asset networks.

In addition to the user account data 1228, the user account 1220 can include ledger(s) for account(s) managed by the service provider of FIG. 11, for the user. For example, the user account 1220 may include an asset ledger 1234, a fiat currency ledger 1236, and/or one or more other ledgers 1238. The ledger(s) can indicate that a corresponding user utilizes the service provider of FIG. 11 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual ones of the ledger(s), or portions thereof, can be maintained by the service provider of FIG. 11.

In some examples, the asset ledger 1234 can store a balance for each of one or more cryptocurrencies (e.g., Bitcoin, Ethereum, Litecoin, etc.) registered to the user account 1220. In at least one example, the asset ledger 1234 can further record transactions of cryptocurrency assets associated with the user account 1220. For example, the user account 1220 can receive cryptocurrency from the asset network using the user wallet key(s) 1232. In some examples, the user wallet key(s) 1232 may be generated for the user upon request. User wallet key(s) 1232 can be requested by the user in order to send, exchange, or otherwise control the balance of cryptocurrency held by the service provider of FIG. 11 (e.g., in the asset wallet 1210) and registered to the user. In some examples, the user wallet key(s) 1232 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 11 and the value is credited as a balance in asset ledger 1234), by purchasing currency in the form associated with the account using currency in a different form (e.g., buying a value of cryptocurrency from the service provider of FIG. 11 using a value of fiat currency reflected in fiat currency ledger 1236, and crediting the value of cryptocurrency in asset ledger 1234), or by conducting a transaction with another user (customer or merchant) of the service provider of FIG. 11 wherein the account receives incoming currency (which can be in the form associated with the account or a different form, in which the incoming currency may be converted to the form associated with the account). In some examples, the user account data 1228 can include preferences for maintaining balances of individual ones of the ledgers. For example, the service provider of FIG. 11 can automatically debit the fiat currency ledger 1236 to increase the asset ledger 1234, or another account associated with the user whenever the cryptocurrency balance (e.g., of the asset ledger 1234) falls below a stated level (e.g., a threshold). Conversely, in some embodiments, the service provider of FIG. 11 can automatically credit the fiat currency ledger 1236 to decrease the asset ledger 1234 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party unrelated to the service provider of FIG. 11 (i.e., an external account). In at least one example, the user can transfer all or a portion of a balance of the cryptocurrency stored in the third-party cryptocurrency wallet to the service provider of FIG. 11. Such a transaction can request that the user to transfer an amount of the cryptocurrency in a message signed by user's private key to an address provided by the service provider of FIG. 11. In at least one example, the transaction can be sent to miners to bundle the transaction into a block of transactions and to verify the authenticity of the transactions in the block. Once a miner has verified the block, the block is written to a public, distributed blockchain where the service provider of FIG. 11 can then verify that the transaction has been confirmed and can credit the user's asset ledger 1234 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 11. As described above, in some examples, the service provider of FIG. 11 can acquire cryptocurrency from a third-party source. In such examples, the asset wallet 1210 can be associated with different addresses and can vary addresses used to acquire cryptocurrency so that its holdings are represented under a variety of addresses on a blockchain. When the service provider of FIG. 11 has their own holdings of cryptocurrency, users can acquire cryptocurrency directly from the service provider of FIG. 11. In some examples, the service provider of FIG. 11 can include logic for buying and selling cryptocurrency in order to maintain a desired level of cryptocurrency. The desired level can be based on a volume of transactions over a period, balances of collective user profiles' cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from customer-merchant transactions, and therefore not necessarily time-sensitive.

In examples where the service provider of FIG. 11 has its own cryptocurrency assets, cryptocurrency transferred in a transaction (e.g., data with address provided for receipt of transaction and a balance of cryptocurrency transferred in the transaction) can be stored in the asset wallet 1210. In at least one example, the service provider of FIG. 11 can credit the asset ledger 1234 of the user. Additionally, while the service provider of FIG. 11 recognizes that the user retains the value of the transferred cryptocurrency through crediting the asset ledger 1234, any person that inspects the blockchain will see the cryptocurrency as having been transferred to the service provider of FIG. 11. In some examples, the asset wallet 1210 can be associated with many different addresses. In such examples, any person that inspects the blockchain may not easily associate all cryptocurrency stored in asset wallet 1210 as belonging to the same entity. It is this presence of a private ledger that is used for real-time transactions and maintained by the service provider of FIG. 11, combined with updates to the public ledger at other times, that allows for extremely fast transactions using cryptocurrency to be achieved. In some examples, the "private ledger" can refer to the asset ledger 1234, which in some examples, can utilize the private blockchain 1219, as described herein. The "public ledger" can correspond to a public blockchain associated with the asset network.

In at least one example, a user's asset ledger 1234, fiat currency ledger 1236, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1234. In some examples, a user can receive fiat currency or another currency in the form of payment for a transaction with another user. In at least one example, at least a portion of such funds can be converted into cryptocurrency by the service provider of FIG. 11 and used to fund the asset ledger 1234 of the user.

As addressed above, in some examples, users can also have other accounts maintained by the service provider of FIG. 11. For example, a user can also have an account in U.S. dollars, which can be tracked, for example, via the fiat currency ledger 1236. Such an account can be funded by transferring money from a bank account at a third-party bank to an account maintained by the service provider of FIG. 11 as is conventionally known. In some examples, a user can receive fiat currency in the form of payment for a transaction with another user. In such examples, at least a portion of such funds can be used to fund the fiat currency ledger 1236.

In some examples, a user can have one or more internal payment cards registered with the service provider of FIG. 11. Internal payment cards can be linked to one or more of the accounts associated with the user account 1220. In some embodiments, options with respect to internal payment cards can be adjusted and managed using an application (e.g., the payment application 1118).

In at least one example, as described above, each ledger can correspond to an account of the user that is managed by the service provider of FIG. 11. In at least one example, individual ones of the accounts can be associated with a wallet or a stored balance for use in payment transactions, peer-to-peer transactions, payroll payments, etc.

In at least one example, the user account 1220 can be associated with an asset wallet 1240. The asset wallet 1240 of the user can be associated with account information that can be stored in the user account data 1228 and, in some examples, can be associated with the user wallet key(s) 1232. In at least one example, the asset wallet 1240 can store data indicating an address provided for receipt of a cryptocurrency transaction. In at least one example, the balance of the asset wallet 1240 can be based at least in part on a balance of the asset ledger 1234. In at least one example, funds availed via the asset wallet 1240 can be stored in the asset wallet 1240 or the asset wallet 1210. Funds availed via the asset wallet 1210 can be tracked via the asset ledger 1234. The asset wallet 1240, however, can be associated with additional cryptocurrency funds.

In at least one example, when the service provider of FIG. 11 includes a private blockchain 1219 for recording and validating cryptocurrency transactions, the asset wallet 1240 can be used instead of, or in addition to, the asset ledger 1234. For example, at least one example, a merchant can provide the address of the asset wallet 1240 for receiving payments. In an example where a customer is paying in cryptocurrency and the customer has their own cryptocurrency wallet account associated with the service provider of FIG. 11, the customer can send a message signed by its private key including its wallet address (i.e., of the customer) and identifying the cryptocurrency and value to be transferred to the merchant's asset wallet 1240. The service provider of FIG. 11 can complete the transaction by reducing the cryptocurrency balance in the customer's cryptocurrency wallet and increasing the cryptocurrency balance in the merchant's asset wallet 1240. In addition to recording the transaction in the respective cryptocurrency wallets, the transaction can be recorded in the private blockchain 1219 and the transaction can be confirmed. A user can perform a similar transaction with cryptocurrency in a peer-to-peer transaction as described above. In at least one example, the cryptocurrency wallet account 1230 can be funded by a balance transfer from a third-party cryptocurrency wallet, as described above. Such a transaction can include requesting a user to transfer an amount of cryptocurrency in a message signed by the user's private key to an address of the cryptocurrency wallet account 1230. The transferred amount of cryptocurrency can then be within the cryptocurrency wallet account 1230 for use in later transactions.

While the asset ledger 1234 and/or asset wallet 1240 are each described above with reference to cryptocurrency, the asset ledger 1234 and/or asset wallet 1240 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 11 is an aspect of the technology disclosed that enables technical advantages of increased processing speed and improved security.

Figure 13:
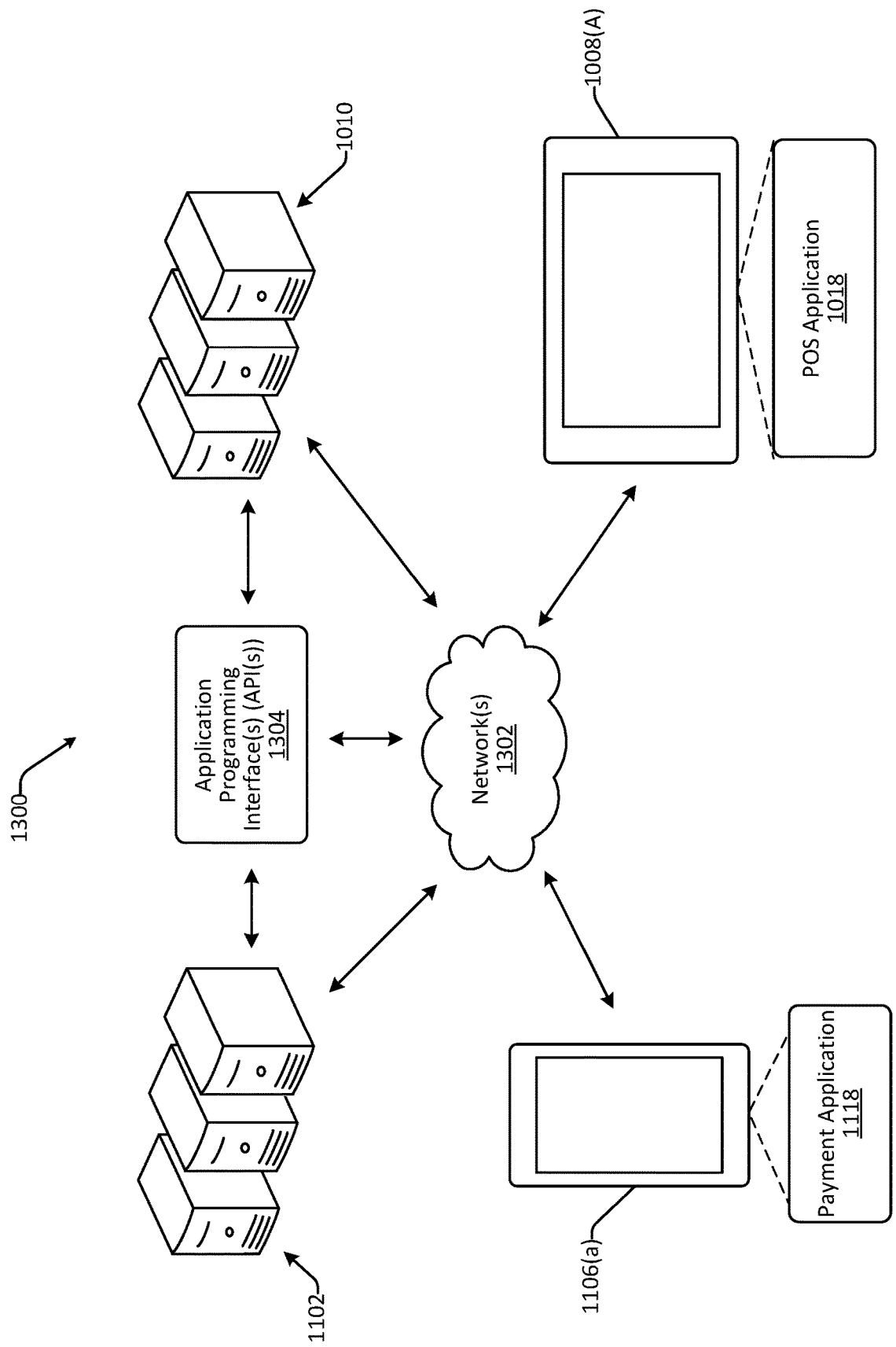
FIG. 13 is an example environment wherein the payment service environment of FIG. 10 and the environment from FIG. 11 can be integrated to enable payments at the point-of-sale using assets associated with user accounts in the peer-to-peer environment of FIG. 11, according to an embodiment described herein.

FIG. 13 illustrates an example environment 1300 wherein the environment 1000 and the environment 1100 can be integrated to enable payments at the point-of-sale using assets associated with user accounts in the peer-to-peer environment of FIG. 11. As illustrated, each of the components can communicate with one another via one or more networks 1302. In some examples, one or more APIs 1304 or other functional components can be used to facilitate such communication.

In at least one example, the example environment 1300 can enable contactless payments, via integration of peer-to-peer payment, or other payment making, platform(s) and payment processing platform(s), are described herein. For the purpose of FIG. 13, the environment 1000 can refer to a payment processing platform and the environment 1100 can refer to a peer-to-peer payment, or payment making, platform. In an example, such an integration can enable a customer to participate in a transaction via their own computing device instead of interacting with a merchant device of a merchant, such as the merchant device 1008(A). In such an example, the POS application 1018, associated with a payment processing platform and executable by the merchant device 1008(A) of the merchant, can present a Quick Response (QR) code, or other code that can be used to identify a transaction (e.g., a transaction code), in association with a transaction between the customer and the merchant. The QR code, or other transaction code, can be provided to the POS application 1018 via an API associated with the peer-to-peer payment platform. In an example, the customer can utilize their own computing device, such as the user device 1108(A), to capture the QR code, or the other transaction code, and to provide an indication of the captured QR code, or other transaction code, to server(s) 1002 and/or server(s) 1102.

Based at least in part on the integration of the peer-to-peer payment platform and the payment processing platform (e.g., via the API), the server(s) 1002 and/or 1102 associated with each can exchange communications with each other—and with a payment application 1118 associated with the peer-to-peer payment platform and/or the POS application 1018—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1108(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1108(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1018 and the payment application 1118, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1108(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1018, associated with a payment processing platform, on the merchant device 1008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1008(A) can present a QR code, or other transaction code, that can be associated with a peer-to-peer payment platform. The customer can use a camera associated with the user device 1108(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1018, associated with a payment processing platform, on the merchant device 1008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1018 can cause a text message with a resource locator (e.g., uniform resource locator (URL)) that can be associated with a peer-to-peer payment platform to be sent to the user device 1108(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1108(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1018 of a merchant device 1008(A) at a brick-and-mortar store of a merchant to a payment application 1118 of a user device 1108(A) of a customer to enable the customer to participate in a transaction via their own computing device. For instance, in a "scan to pay" example as described above, based at least in part on capturing the QR code, or other transaction code, via the user device 1108(A), the payment processing platform can provide transaction data to the peer-to-peer payment platform for presentation via the payment application 1118 on the user device 1108(A). In some examples, the customer can watch items being added to their cart (e.g., via a user interface presented via the payment application). As an item is added to a virtual cart by the merchant—via the POS application 1018 on the merchant device 1008(A) of the merchant—the customer can see the item in their virtual cart on their own computing device in near-real time. In another example, the peer-to-peer payment platform can analyze transaction data as that data is received to determine whether an incentive (e.g., a discount, a loyalty reward, prioritized access or booking, etc.) is applicable to the transaction and can automatically apply the incentive or send a recommendation to the payment application 1118 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1108(A) during or after payment of the transaction.

In some examples, based at least in part on capturing the QR code, or other transaction code, the payment processing platform can provide transaction data to the peer-to-peer payment platform for presentation via the payment application 1118 on the computing device of the customer, such as the user device 1108(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1118 such that the customer can provide gratuity, feedback, loyalty information, or the like, via an interaction with the user interface. In another example, the payment processing platform can adjust a total amount of a transaction based on events during a shopping experience, such as adding or removing a charge to the total amount based on whether a media content item requested by the customer to be played during a shopping experience was in fact played. In some examples, because the customer has already authorized payment via the peer-to-peer payment platform, if the customer inputs a tip and/or an event affecting the total amount of the transaction is triggered, the peer-to-peer payment platform can transfer additional funds, associated with the tip or event, to the payment processing platform. This pre-authorization (or maintained authorization) of sorts can enable faster, more efficient payment processing when the tip is received and/or the event initiates the trigger. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, play media content, or the like without being watched by the merchant or other customers.

In some examples, such as when the QR code, or other transaction code, is captured by the computing device of the customer prior to a payment selection user interface being presented via the POS application 1018, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1118 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 14:
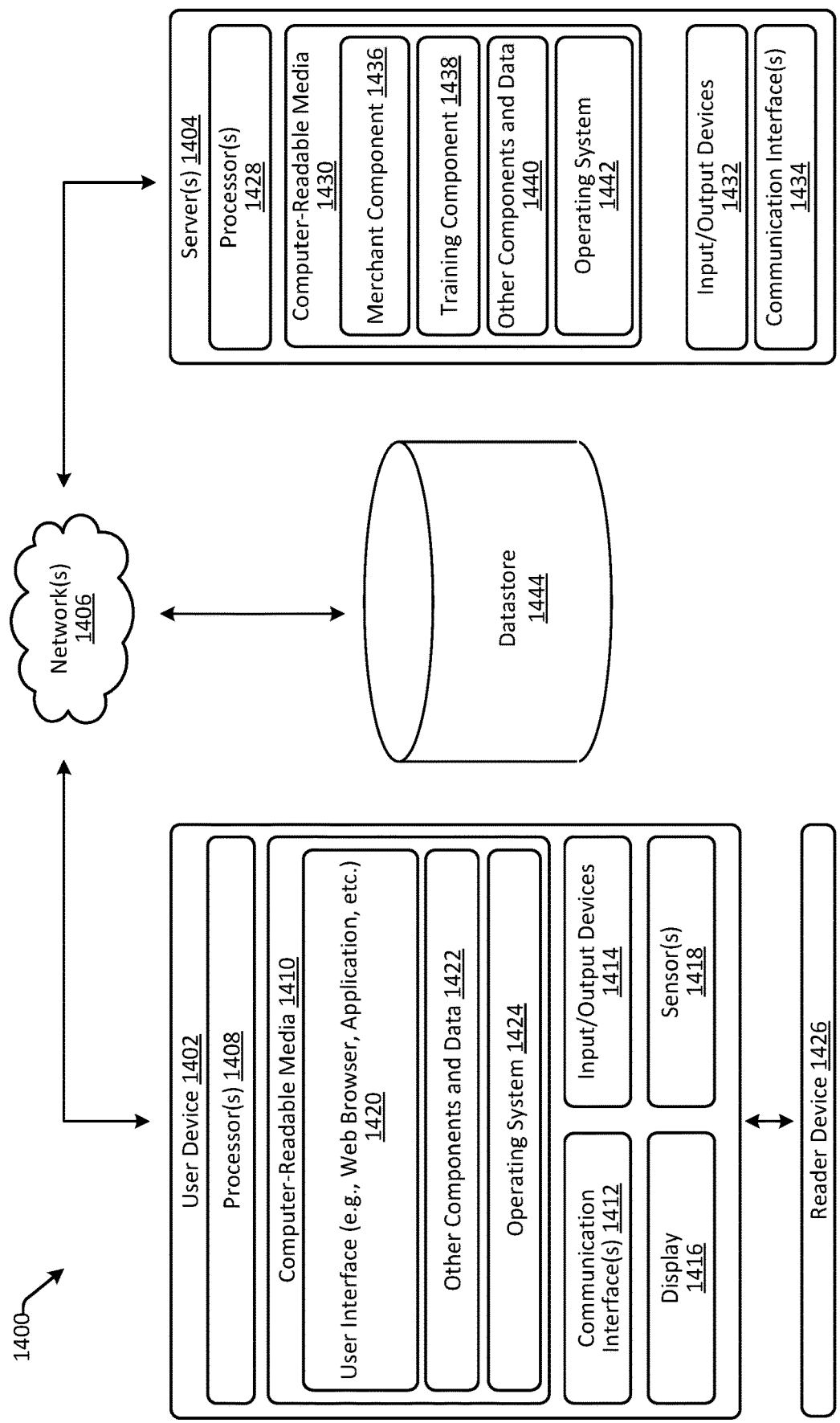
FIG. 14 is an illustrative block diagram illustrating a system for performing techniques described herein, according to an embodiment described herein.

FIG. 14 depicts an illustrative block diagram illustrating a system 1400 for performing techniques described herein. The system 1400 includes a user device 1402, that communicates with server computing device(s) (e.g., server(s) 1404) via network(s) 1406 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1402 is illustrated, in additional or alternate examples, the system 1400 can have multiple user devices, as described above with reference to FIG. 11.

In examples, the components of the media content platform 104 described with respect to FIG. 1 may be components of the server(s) 1404. Furthermore, the components of the client device 102 described with respect to FIG. 1 may be components of the user device 1402.

In at least one example, the user device 1402 can be any suitable type of computing device, e.g., portable, semi-portable, semi-stationary, or stationary. Some examples of the user device 1402 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, a speaker device, an automobile or other vehicle type, an Internet of Things (IoT) device, etc. That is, the user device 1402 can be any computing device capable of sending communications and performing the functions according to the techniques described herein. The user device 1402 can include devices, e.g., payment card readers, or components capable of accepting payments, as described below.

In the illustrated example, the user device 1402 includes one or more processors 1408, one or more computer-readable media 1410, one or more communication interface(s) 1412, one or more input/output (I/O) devices 1414, a display 1416, sensor(s) 1418, one or more encoders 1446, and one or more decoders 1448.

In at least one example, each processor 1408 can itself comprise one or more processors or processing cores. For example, the processor(s) 1408 can be implemented as one or more microprocessors, microcomputers, microcontrollers, digital signal processors, central processing units, state machines, logic circuitries, and/or any devices that manipulate signals based on operational instructions. In some examples, the processor(s) 1408 can be one or more hardware processors and/or logic circuits of any suitable type specifically programmed or configured to execute the algorithms and processes described herein. The processor(s) 1408 can be configured to fetch and execute computer-readable processor-executable instructions stored in the computer-readable media 1410.

Depending on the configuration of the user device 1402, the computer-readable media 1410 can be an example of tangible computer storage media or tangible non-transitory computer storage media and can include volatile and non-volatile memory and/or removable and non-removable media implemented in any type of technology for storage of information such as computer-readable processor-executable instructions, data structures, program components or other data. The computer-readable media 1410 can include, but is not limited to, RAM, ROM, EEPROM, flash memory, solid-state storage, magnetic disk storage, optical storage, and/or other computer-readable media technology. Further, in some examples, the user device 1402 can access external storage, such as RAID storage systems, storage arrays, network attached storage, storage area networks, cloud storage, or any other medium that can be used to store information and that can be accessed by the processor(s) 1408 directly or through another computing device or network. Accordingly, the computer-readable media 1410 can be computer storage media able to store instructions, components or components that can be executed by the processor(s) 1408. Further, when mentioned, computer-readable media and/or non-transitory computer-readable media exclude media such as energy, carrier signals, electromagnetic waves, and signals per se.

The computer-readable media 1410 can be used to store and maintain any number of functional components that are executable by the processor(s) 1408. In some implementations, these functional components comprise instructions or programs that are executable by the processor(s) 1408 and that, when executed, implement operational logic for performing the actions and services attributed above to the user device 1402. Functional components stored in the computer-readable media 1410 can include a user interface 1420 to enable users to interact with the user device 1402, and thus the server(s) 1404 and/or other networked devices. In at least one example, the user interface 1420 can be presented via a web browser, or the like. In other examples, the user interface 1420 can be presented via an application, such as a mobile application or desktop application, which can be provided by a service provider associated with the server(s) 1404, or which can be an otherwise dedicated application. In some examples, the user interface 1420 can be the user interface 120 described with respect to FIG. 1 and/or any of the other user interfaces described with respect to FIGS. 1-9. In at least one example, a user can interact with the user interface via touch input, spoken input, gesture, or any other type of input. The word "input" is also used to describe "contextual" input that may not be directly provided by the user via the user interface 1420. For example, user's interactions with the user interface 1420 are analyzed using, e.g., natural language processing techniques, user movement tracking techniques, eye tracking techniques, etc. to determine context or intent of the user, which may be treated in a manner similar to "direct" user input.

Depending on the type of the user device 1402, the computer-readable media 1410 can also optionally include other functional components and data, such as other components and data 1422, which can include programs, drivers, etc., and the data used or generated by the functional components. In addition, the computer-readable media 1410 can also store data, data structures and the like, that are used by the functional components. Further, the user device 1402 can include many other logical, programmatic and physical components, of which those described are merely examples that are related to the discussion herein.

In at least one example, the computer-readable media 1410 can include additional functional components, such as an operating system 1424 for controlling and managing various functions of the user device 1402 and for enabling basic user interactions.

The communication interface(s) 1412 can include one or more interfaces and hardware components for enabling communication with various other devices, such as over the network(s) 1406 or directly. For example, communication interface(s) 1412 can enable communication through one or more network(s) 1406, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1406 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1402 can further include one or more input/output (I/O) devices 1414. The I/O devices 1414 can include speakers, a microphone, a camera, and various user controls (e.g., buttons, a joystick, a keyboard, a keypad, etc.), a haptic output device, and so forth. The I/O devices 1414 can also include attachments that leverage the accessories (audio-jack, USB-C, Bluetooth, etc.) to connect with the user device 1402.

In at least one example, user device 1402 can include a display 1416. Depending on the type of computing device(s) used as the user device 1402, the display 1416 can employ any suitable display technology. For example, the display 1416 can be a liquid crystal display, a plasma display, a light emitting diode display, an OLED (organic light-emitting diode) display, an electronic paper display, or any other suitable type of display able to present digital content thereon. In at least one example, the display 1416 can be an augmented reality display, a virtual reality display, or any other display able to present and/or project digital content. In some examples, the display 1416 can have a touch sensor associated with the display 1416 to provide a touchscreen display configured to receive touch inputs for enabling interaction with a graphic interface presented on the display 1416. Accordingly, implementations herein are not limited to any particular display technology. Alternatively, in some examples, the user device 1402 may not include the display 1416, and information can be presented by other means, such as aurally, haptically, etc.

In addition, the user device 1402 can include sensor(s) 1418. The sensor(s) 1418 can include a GPS device able to indicate location information. Further, the sensor(s) 1418 can include, but are not limited to, an accelerometer, gyroscope, compass, proximity sensor, camera, microphone, and/or a switch.

In some examples, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use the loan for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users 1114 entering a brick-and-mortar store of a merchant. In some cases, location may be used to control media content playback, such as by "handing off" playback of a particular media content item from one device to another responsive to a user crossing a geofence or other location threshold. Location can be used in additional or alternative ways as well.

In examples, the user device 1402 includes a codec system, which may comprise an encoder 1446 and/or a decoder 1448. The encoder 1446 is configured to encode a data stream or signal from an analog signal (e.g., an analog audio signal, an analog video signal, etc.) to a digital signal for transmission or storage. The decoder 1448 is configured to convert the digital signal back to an analog signal, such as for playback or editing. In some cases, the encoder 1446 may be configured to encode the data stream or analog signal in an encrypted format, and the decoder 1448 may accordingly be configured to decrypt the digital signal as part of the decoding process (e.g., using a cryptographic key). Additionally, in some examples, the encoder 1446 may compress data to reduce transmission bandwidth and/or storage space for the digital signal. One example of a compression codec system is a lossless codec, in which the digital data stream is a compressed format of the original data stream, but retains all of the information present in the original data stream. Another example of a compression codec system is a lossy codec which reduces the quality of the digital data stream but can increase the compression of the data stream relative to lossless codec systems. The codec system comprising the encoder 1446 and/or the decoder 1448 may be specialized to accomplish various different objectives, such as to preserve motion, preserve color, minimize latency, maintain fidelity, minimize bit-rate, optimize for different output device types, maintain synchronization of audio and video (e.g., using a metadata synchronization data stream), and so on. Although not explicitly illustrated in the example system 1400, the server 1404 may include an encoder 1446 and/or a decoder 1448 as well.

Additionally, the user device 1402 can include various other components that are not shown, examples of which include removable storage, a power source, such as a battery and power control unit, a barcode scanner, a printer, a cash drawer, and so forth.

In addition, in some examples, the user device 1402 can include, be connectable to, or otherwise be coupled to a reader device 1426, for reading payment instruments and/or identifiers associated with payment objects. In some examples, as described above, the reader device 1426 can plug in to a port in the user device 1402, such as a microphone port, a headphone port, an audio-jack, a data port, or other suitable port. In additional or alternative examples, the reader device 1426 can be coupled to the user device 1402 via another wired or wireless connection, such as via a Bluetooth®, BLE, and so on. The reader device 1426 can include a read head for reading a magnetic strip of a payment card, and further can include encryption technology for encrypting the information read from the magnetic strip. Additionally or alternatively, the reader device 1426 can be an EMV payment reader, which in some examples, can be embedded in the user device 1402. Moreover, numerous other types of readers can be employed with the user device 1402 herein, depending on the type and configuration of the user device 1402.

The reader device 1426 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1426 may include hardware implementation, such as slots, magnetic tracks, and rails with one or more sensors or electrical contacts to facilitate detection and acceptance of a payment instrument. That is, the reader device 1426 may include hardware implementations to enable the reader device 1426 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1426 may also include a biometric sensor to receive and process biometric characteristics and process them as payment instruments, given that such biometric characteristics are registered with the payment service and connected to a financial account with a bank server.

The reader device 1426 may include processing unit(s), computer-readable media, a reader chip, a transaction chip, a timer, a clock, a network interface, a power supply, and so on. The processing unit(s) of the reader device 1426 may execute one or more components and/or processes to cause the reader device 1426 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1426, the computer-readable media may include volatile memory (such as RAM), non-volatile memory (such as ROM, flash memory, miniature hard drive, memory card, or the like), or some combination thereof. In at least one example, the computer-readable media of the reader device 1426 may include at least one component for performing various functions as described herein.

The reader chip may perform functionalities to control the operations and processing of the reader device 1426. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1406, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1426. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1402, which can be a POS terminal, and the reader device 1426 are shown as separate devices, in additional or alternative examples, the user device 1402 and the reader device 1426 can be part of a single device, which may be a battery-operated device. In such an example, components of both the user device 1402 and the reader device 1426 may be associated with the single device. In some examples, the reader device 1426 can have a display integrated therewith, which can be in addition to (or as an alternative of) the display 1416 associated with the user device 1402.

The server(s) 1404 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1404 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1404 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1404 can include one or more processors 1428, one or more computer-readable media 1430, one or more I/O devices 1432, and one or more communication interfaces 1434. Each processor 1428 can be a single processing unit or a number of processing units, and can include single or multiple computing units or multiple processing cores. The processor(s) 1428 can be implemented as one or more microprocessors, microcomputers, microcontrollers, digital signal processors, central processing units, state machines, logic circuitries, and/or any devices that manipulate signals based on operational instructions. For example, the processor(s) 1428 can be one or more hardware processors and/or logic circuits of any suitable type specifically programmed or configured to execute the algorithms and processes described herein. The processor(s) 1428 can be configured to fetch and execute computer-readable instructions stored in the computer-readable media 1430, which can program the processor(s) 1428 to perform the functions described herein.

The computer-readable media 1430 can include volatile and nonvolatile memory and/or removable and non-removable media implemented in any type of technology for storage of information, such as computer-readable instructions, data structures, program components, or other data. Such computer-readable media 1430 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1404, the computer-readable media 1430 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1430 can be used to store any number of functional components that are executable by the processor(s) 1428. In many implementations, these functional components comprise instructions or programs that are executable by the processors 1428 and that, when executed, specifically configure the one or more processors 1428 to perform the actions attributed above to the service provider and/or payment processing service. Functional components stored in the computer-readable media 1430 can optionally include a merchant component 1436, a training component 1438, and one or more other components and data 1440.

The merchant component 1436 can be configured to receive transaction data from POS systems, such as the POS system 1124 described above with reference to FIG. 11. The merchant component 1436 can transmit requests (e.g., authorization, capture, settlement, etc.) to payment service server computing device(s) to facilitate POS transactions between merchants and customers. The merchant component 1436 can communicate the successes or failures of the POS transactions to the POS systems.

The training component 1438 can be configured to train models using machine-learning mechanisms, as well as retrain the models to improve outputs provided by the models based on feedback received over time. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1402 and/or the server(s) 1404 for use at a time after the data models have been trained (e.g., at runtime).

The one or more other components and data 1440 can include the prediction component 140, the artificial intelligence model(s) 136, and/or the media content items 142, the functionality of which is described, at least partially, above. Further, the one or more other components and data 1440 can include programs, drivers, etc., and the data used or generated by the functional components. Further, the server(s) 1404 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on a storage medium or a non-transitory storage medium (e.g., volatile or non-volatile memory for a computing device), hardware, or firmware (or any combination thereof) components. Modules are typically functional such that they may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1430 can additionally include an operating system 1442 for controlling and managing various functions of the server(s) 1404.

The communication interface(s) 1434 can include one or more interfaces and hardware components for enabling communication with various other devices, such as over the network(s) 1406 or directly. For example, communication interface(s) 1434 can enable communication through one or more network(s) 1406, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1406 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1404 can further be equipped with various I/O devices 1432. Such I/O devices 1432 can include a display, various user interface controls (e.g., buttons, joystick, keyboard, mouse, touch screen, biometric or sensory input devices, etc.), audio speakers, connection ports and so forth.

In at least one example, the system 1400 can include a datastore 1444 that can be configured to store data that is accessible, manageable, and updatable. In some examples, the datastore 1444 can be integrated with the user device 1402 and/or the server(s) 1404. In other examples, as shown in FIG. 14, the datastore 1444 can be located remotely from the server(s) 1404 and can be accessible to the server(s) 1404. The datastore 1444 can comprise multiple databases and/or servers connected locally and/or remotely via the network(s) 1406.

In at least one example, the datastore 1444 can store user profiles, which can include merchant profiles, customer profiles, artist profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, media content consumption data (e.g., number of streams of media content and by which artists, direct artist payouts, playlists generated or "favorited," durations of listening and/or watching individual media content items, actions performed while consuming media content (e.g., skips, repeats, volume changes, etc.), locations at which media content is consumed, devices used to consume media content, activities during which media content is consumed, etc.), etc.

Artist profiles can store data including, but not limited to, artist information (e.g., artist's performance or stage name, band name, artist's legal name, record label, phone number, address, social media handles, website address, banking information, etc.), artist preferences (e.g., learned or artist-specified), media content (and/or associated data) at least partially attributed to the artist (e.g., songs, videos, artists in a same genre or having shared listeners, etc.), event data (e.g., tour dates, appearance dates, appointments, etc.), financial data (e.g., advance data, recoupment data, royalty data, payouts data, etc.), payroll data (e.g., employees, contractors, venues, payroll frequency, etc.), listening data (e.g., number of streams on media content platform(s), listening trends, etc.), fan data (number of followers on media content platform(s), number of followers on social media platform(s), etc.), reservations data (e.g., venue reservations, studio recording reservations, previous reservations, upcoming (scheduled) reservations, reservation duration, interactions associated with such reservations, etc.), inventory data (e.g., merchandise inventory), customer service data, and so forth.

Furthermore, in at least one example, the datastore 1444 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1444 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The present disclosure includes methods and systems for predicting media caching include determining likelihoods that given media content items currently displayed on a user interface will be selected by a user for output of the media content items by a client device. The likelihoods are compared and for the media content item or group of media content items with the greatest likelihood of being selected, at least a portion of the media content item or group of media content items are cached in memory of the client device such that, when the media content item or group of items is selected, the portion of the media content item or group of items is output from the cache and a remainder of the item or group of items is streamed from a media content platform.

As will be apparent from the above discussion, any of the methods discussed herein may be implemented by a computer. In other words, a data processing apparatus, device or system can comprise means for carrying out the steps of any of the methods disclosed herein. A computer program can comprise instructions which, when the program is executed by a computer, cause the computer to carry out the steps of any of the methods disclosed herein. Finally, a computer-readable medium can comprise instructions which, when executed by a computer, cause the computer to carry out the steps of any of the methods disclosed herein.

Example Clauses

1. A method comprising: causing display, on a client device, of a user interface provided by a media content platform, the user interface including a representation of a media content item and an additional representation of an additional media content item; determining a likelihood that the media content item will be selected to be played by the client device; determining an additional likelihood that the additional media content item will be selected to be played by the client device; determining that the likelihood is different than the additional likelihood; based on determining that the likelihood is different than the additional likelihood, caching a portion of the media content item in memory of the client device without caching the additional media content item in the memory of the client device; receiving a selection of the representation of the media content item in the user interface; and based at least in part on receiving the selection of the representation of the media content item: surfacing the portion of the media content item cached in the memory of the client device instead of the additional media content item without user intervention; and sending a request to the media content platform to stream a different portion of the media content item than the portion of the media content item cached in the memory of the client device.

2. The method of clause 1, wherein determining the likelihood and determining the additional likelihood are performed by an artificial intelligence model trained to identify likelihoods of media content selections for playback by users.

3. The method of any proceeding clause, further comprising updating the artificial intelligence model based at least in part on the selection of the representation of the media content item in the user interface.

4. The method of any proceeding clause, wherein determining the likelihood is based at least in part on at least one of: a popularity of the media content item relative to other media content items on the media content platform; a recency that the media content item was played by the client device; a time at which the media content item was released by the media content platform; or an association of the media content item with a further media content item that was previously played or is currently being played by the client device.

5. The method of any proceeding clause, further comprising: receiving a request for media content at the client device; providing the request to the media content platform; receiving a response from the media content platform comprising: the user interface for display by the client device; and playback information for the media content item; and caching the request and the playback information included in the response.

6. The method of clause 5, further comprising utilizing the playback information included in the response when the request is received subsequent times without sending another request to the media content platform.

7. A system comprising: one or more processors; and non-transitory computer-readable media storing instructions that, when executed by the one or more processors, cause the one or more processors to perform operations comprising: causing display, on a client device, of a user interface provided by a media content platform, the user interface including a representation of a media content item and an additional representation of an additional media content item; determining a likelihood that the media content item will be selected to be played by the client device; determining an additional likelihood that the additional media content item will be selected to be played by the client device; determining that the likelihood is different than the additional likelihood; based on determining that the likelihood is different than the additional likelihood, caching a portion of the media content item in memory of the client device without caching the additional media content item in the memory of the client device; receiving a selection of the representation of the media content item in the user interface; and based at least in part on receiving the selection of the representation of the media content item: surfacing the portion of the media content item cached in the memory of the client device instead of the additional media content item without user intervention; and sending a request to the media content platform to stream a different portion of the media content item than the portion of the media content item cached in the memory of the client device.

8. The system of clause 7, wherein determining the likelihood and determining the additional likelihood are performed by an artificial intelligence model trained to identify likelihoods of media content selections for playback by users.

9. The system of clause 7 or clause 8, the operations further comprising updating the artificial intelligence model based at least in part on the selection of the representation of the media content item in the user interface.

10. The system of any of clauses 7 to 9, wherein determining the likelihood is based at least in part on at least one of: a popularity of the media content item relative to other media content items on the media content platform; a recency that the media content item was played by the client device; a time at which the media content item was released by the media content platform; or an association of the media content item with a further media content item that was previously played or is currently being played by the client device.

11. The system of any of clauses 7 to 10, the operations further comprising: receiving a request for media content at the client device; providing the request to the media content platform; receiving a response from the media content platform comprising: the user interface for display by the client device; and playback information for the media content item; and caching the request and playback information included in the response.

12. The system of clause 11, the operations further comprising utilizing the playback information included in the response when the request is received subsequent times without sending another request to the media content platform.

13. A system comprising: one or more processors; and non-transitory computer-readable media storing instructions that, when executed by the one or more processors, cause the one or more processors to perform operations comprising: causing display, on a client device, of a user interface provided by a media content platform, the user interface including a representation of a media content item and an additional representation of an additional media content item; determining a likelihood that the media content item will be selected to be played by the client device; determining an additional likelihood that the additional media content item will be selected to be played by the client device; determining that the likelihood is different than the additional likelihood; based on determining that the likelihood is different than the additional likelihood, sending a command to the client device to cache a portion of the media content item in memory of the client device without caching the additional media content item in the memory of the client device; receiving user input data indicating a selection of the representation of the media content item in the user interface; and based at least in part on receiving the user input data: causing the portion of the media content item cached in the memory of the client device to be surfaced instead of the additional media content item without user intervention; and streaming a different portion of the media content item than the portion of the media content item cached in the memory of the client device.

14. The system of clause 13, wherein determining the likelihood and determining the additional likelihood are performed by an artificial intelligence model trained to identify likelihoods of media content selections for playback by users.

15. The system of clause 13 or clause 14, the operations further comprising updating the artificial intelligence model based at least in part on the selection of the representation of the media content item in the user interface.

16. The system of any of clauses 13 to 15, wherein determining the likelihood is based at least in part on at least one of: a popularity of the media content item relative to other media content items on the media content platform; a recency that the media content item was played by the client device; a time at which the media content item was released by the media content platform; or an association of the media content item with a further media content item that was previously played or is currently being played by the client device.

17. The system of any of clauses 13 to 16, the operations further comprising: receiving a request for media content to be output by the client device; sending a response to the request to the client device, the response comprising: data representing the user interface for display by the client device; and playback information for the media content item; and causing the client device to cache the request and playback information included in the response.

18. The system of clause 17, the operations further comprising causing the client device to utilize the playback information included in the response when the request is received subsequent times such that another request is not send from the client device.

19. The system of any of clauses 13 to 18, the operations further comprising: determining attributes associated with prior communications between the client device and the system; and determining the portion of the media content item to be cached in the memory of the client device based at least in part on the attributes.

20. The system of any of clauses 13 to 19, the operations further comprising: determining a device type of the client device, the device type indicating capabilities of the client device to display user interface elements and output media content item types; and wherein determining the likelihood and the additional likelihood is based at least in part on the device type of the client device.

What is claimed is:
1. A method comprising:
causing display, on a client device, of a user interface provided by a media content platform, the user interface including a representation of a media content item and an additional representation of an additional media content item;
determining a likelihood that the media content item will be selected to be played by the client device;
determining an additional likelihood that the additional media content item will be selected to be played by the client device;
determining that the likelihood is different than the additional likelihood;
based on determining that the likelihood is different than the additional likelihood, caching:
a portion of the media content item in memory of the client device without caching the additional media content item in the memory of the client device;
a request associated with the media content item in the memory of the client device; and playback information for the media content item in the memory of the client device;

receiving the request as cached in the memory of the client device indicating a selection of the representation of the media content item in the user interface; and based at least in part on the request being cached in the memory of the client device:

surfacing, utilizing the playback information as cached in the memory of the client device, the portion of the media content item cached in the memory of the client device instead of the additional media content item without user intervention; and sending a request to the media content platform to stream a different portion of the media content item than the portion of the media content item cached in the memory of the client device.

2. The method of claim 1, wherein determining the likelihood and determining the additional likelihood are performed by an artificial intelligence model trained to identify likelihoods of media content selections for playback by users.

3. The method of claim 2, further comprising updating the artificial intelligence model based at least in part on the selection of the representation of the media content item in the user interface.

4. The method of claim 1, wherein determining the likelihood is based at least in part on a time at which the media content item was released by the media content platform.

5. The method of claim 1, further comprising utilizing the playback information, without sending another request to the media content platform, when the request is received at the client device subsequent times.

6. A system comprising:
one or more processors; and
non-transitory computer-readable media storing instructions that, when executed by the one or more processors, cause the one or more processors to perform operations comprising:
causing display, on a client device, of a user interface provided by a media content platform, the user interface including a representation of a media content item and an additional representation of an additional media content item;
determining a likelihood that the media content item will be selected to be played by the client device;
determining an additional likelihood that the additional media content item will be selected to be played by the client device;
determining that the likelihood is different than the additional likelihood;
based on determining that the likelihood is different than the additional likelihood, caching:
a portion of the media content item in memory of the client device without caching the additional media content item in the memory of the client device;
a request associated with the media content item in the memory of the client device; and
playback information for the media content item in the memory of the client device;
receiving the request as cached in the memory of the client device indicating a selection of the representation of the media content item in the user interface; and
based at least in part on the request being cached in the memory of the client device:
surfacing, utilizing the playback information as cached in the memory of the client device, the portion of the media content item cached in the memory of the client device instead of the additional media content item without user intervention; and
sending a request to the media content platform to stream a different portion of the media content item than the portion of the media content item cached in the memory of the client device.

7. The system of claim 6, wherein determining the likelihood and determining the additional likelihood are performed by an artificial intelligence model trained to identify likelihoods of media content selections for playback by users.

8. The system of claim 7, the operations further comprising updating the artificial intelligence model based at least in part on the selection of the representation of the media content item in the user interface.

9. The system of claim 6, wherein determining the likelihood is based at least in part on an association of the media content item with a further media content item that was previously played or is currently being played by the client device.

10. The system of claim 6, the operations further comprising utilizing the playback information, without sending another request to the media content platform, when the request is received at the client device subsequent times.

11. A system comprising:
one or more processors; and
non-transitory computer-readable media storing instructions that, when executed by the one or more processors, cause the one or more processors to perform operations comprising:
causing display, on a client device, of a user interface provided by a media content platform, the user interface including a representation of a media content item and an additional representation of an additional media content item;
determining a likelihood that the media content item will be selected to be played by the client device;
determining an additional likelihood that the additional media content item will be selected to be played by the client device;
determining that the likelihood is different than the additional likelihood;
based on determining that the likelihood is different than the additional likelihood, sending a command to the client device to cache:
a portion of the media content item in memory of the client device without caching the additional media content item in the memory of the client device;
a request associated with the media content item in the memory of the client device; and
playback information for the media content item in the memory of the client device;
receiving the request as cached in the memory of the client device indicating a selection of the representation of the media content item in the user interface; and
based at least in part on the request being cached in the memory of the client device:
causing, utilizing the playback information as cached in the memory of the client device, the portion of the media content item cached in the memory of the client device to be surfaced instead of the additional media content item without user intervention; and streaming a different portion of the media content item than the portion of the media content item cached in the memory of the client device.

12. The system of claim 11, wherein determining the likelihood and determining the additional likelihood are performed by an artificial intelligence model trained to identify likelihoods of media content selections for playback by users.

13. The system of claim 12, the operations further comprising updating the artificial intelligence model based at least in part on the selection of the representation of the media content item in the user interface.

14. The system of claim 11, wherein determining the likelihood is based at least in part on at least one of:

a time at which the media content item was released by the media content platform; or an association of the media content item with a further media content item that was previously played or is currently being played by the client device.

15. The system of claim 11, the operations further comprising causing the client device to utilize the playback information, such that another request is not sent from the client device, when the request is received at the client device subsequent times.

16. The system of claim 11, the operations further comprising:

determining attributes associated with prior communications between the client device and the system; and determining the portion of the media content item to be cached in the memory of the client device based at least in part on the attributes.

17. The system of claim 11, the operations further comprising:

determining a device type of the client device, the device type indicating capabilities of the client device to display user interface elements and output media content item types; and wherein determining the likelihood and the additional likelihood is based at least in part on the device type of the client device.

18. The method of claim 1, further comprising determining an activity that the user is involved in when the request is received, and wherein determining the likelihood is based at least in part on the activity.

19. The method of claim 1, further comprising determining an application being utilized by the client device when the request is received, and wherein determining the likelihood is based at least in part on the application being utilized.

20. The method of claim 1, wherein caching the request in the memory of the client device further comprises generating an association between the request and the media content item on the client device.

* * * * *